(12) United States Patent
Degtyarenko et al.

(10) Patent No.: US 12,086,297 B2
(45) Date of Patent: Sep. 10, 2024

(54) ELECTRONIC DEVICE AND METHOD FOR MASKING AND UNMASKING OF HANDWRITTEN INFORMATION IN ELECTRONIC DEVICE

(71) Applicant: SAMSUNG ELECTRONICS CO., LTD., Suwon-si (KR)

(72) Inventors: Ilya Degtyarenko, Kyiv (UA); Nataliya Sakhnenko, Kyiv (UA); Olga Radyvonenko, Kyiv (UA); Valentyna Volkova, Kyiv (UA)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/991,350

(22) Filed: Nov. 21, 2022

(65) Prior Publication Data

US 2023/0169217 A1    Jun. 1, 2023

Related U.S. Application Data

(63) Continuation of application No. PCT/KR2022/015769, filed on Oct. 17, 2022.

(30) Foreign Application Priority Data

Nov. 29, 2021   (KR) .................. 10-2021-0167557

(51) Int. Cl.
  *G06F 21/84*   (2013.01)
  *G06F 3/04883*  (2022.01)

(52) U.S. Cl.
  CPC .......... *G06F 21/84* (2013.01); *G06F 3/04883* (2013.01)

(58) Field of Classification Search
  CPC .............................. G06F 3/04883; G06F 21/84
  See application file for complete search history.

(56) References Cited

U.S. PATENT DOCUMENTS

| 5,181,255 A | 1/1993 | Bloomberg |
| 2001/0026262 A1 | 10/2001 | Van Gestel et al. |

(Continued)

FOREIGN PATENT DOCUMENTS

| JP | 2003-150903 | 5/2003 |
| KR | 10-2004-0015745 | 2/2004 |

(Continued)

OTHER PUBLICATIONS

Search Report dated Jan. 25, 2023 in International Patent Application No. PCT/KR2022/015769.

(Continued)

*Primary Examiner* — Andrea C Leggett
(74) *Attorney, Agent, or Firm* — Nixon & Vanderhye, P.C.

(57) ABSTRACT

An electronic device may include a display, a memory, and at least one processor operatively connected to the display and the memory. The at least one processor is configured to acquire, based on input of first handwritten information, first personalized feature data corresponding to a first personalized feature from the first handwritten information, acquire, from the first handwritten information, first content data from which the first personalized feature has been removed, encode the first personalized feature data, acquire first masked handwritten information based on the encoded first personalized feature data and the first content data, and provide the first masked handwritten information on the display.

20 Claims, 22 Drawing Sheets

(56) References Cited

U.S. PATENT DOCUMENTS

| | | | |
|---|---|---|---|
| 2007/0140561 A1 | 6/2007 | Abdulkader et al. | |
| 2011/0157611 A1 | 6/2011 | Rimai et al. | |
| 2013/0343639 A1 | 12/2013 | Benko et al. | |
| 2015/0131874 A1 | 5/2015 | Mettyear et al. | |
| 2016/0154997 A1 | 6/2016 | Kim et al. | |
| 2016/0179764 A1 | 6/2016 | Kelso et al. | |
| 2020/0026951 A1 | 1/2020 | Chowdhury et al. | |
| 2020/0097763 A1* | 3/2020 | Haerterich | G06N 20/00 |
| 2021/0134029 A1 | 5/2021 | Kim et al. | |
| 2021/0193136 A1 | 6/2021 | Walters et al. | |
| 2022/0066720 A1* | 3/2022 | Kasatani | G06V 30/32 |

FOREIGN PATENT DOCUMENTS

| | | |
|---|---|---|
| KR | 10-1411241 | 6/2014 |
| WO | 2002/103619 | 12/2002 |

OTHER PUBLICATIONS

Written Opinion dated Jan. 25, 2023 in International Patent Application No. PCT/KR2022/015769.

* cited by examiner

ELECTRONIC DEVICE AND METHOD FOR MASKING AND UNMASKING OF HANDWRITTEN INFORMATION IN ELECTRONIC DEVICE

CROSS-REFERENCE TO RELATED APPLICATIONS

This application is a continuation of International Application No. PCT/KR2022/015769 designating the United States, filed on Oct. 17, 2022, in the Korean Intellectual Property Receiving Office and claiming priority to Korean Patent Application No. 10-2021-0167557 filed on Nov. 29, 2021, in the Korean Intellectual Property Office, the disclosures of all of which are incorporated by reference herein in their entireties.

BACKGROUND

Field

The disclosure relates to an electronic device and a method for processing handwritten information in an electronic device.

Description of Related Art

Recently, the use of easily portable electronic devices such as smart phones, tablet PCs, or wearable devices has increased, and a user may use various functions using various input means, for example, input tools such as an electronic pen (e.g., a stylus pen) as well as a finger.

An input method using a stylus pen enables a more precise touch input than a touch input method using a finger, and may thus be more usefully applied when executing applications based on a handwritten input such as a memo or a sketch. In addition, a content generation method using a handwritten input has a high degree of freedom in content generation, enables a more intuitive and quicker input, and employs improved character recognition technology for a handwritten content. Therefore, the use of a content generation method using a handwritten input is greatly increasing.

By using the stylus pen, the user may input text, draw, or sign through handwriting on the screen of an electronic device.

SUMMARY

People may perform handwriting with different physical characteristics and by different handwriting methods, and thus an individual's writing (or handwriting) may have a unique characteristic of the individual. Therefore, the characteristics of an individual's handwriting may be important information usable to identify an individual. For example, in the case of a handwritten signature, a subject may be identified by the signature itself, but when a signature content is similar, the subject may be identified through characteristics of handwriting. Further, graphology, which analyzes the unique characteristics (or handwriting) of an individual's handwriting from the handwriting to estimate the personality, disposition, or psychological state of the individual or estimate the identity, behavioral pattern, fortune, or even future of the individual, is actively being studied.

Recently, digital handwriting using a stylus pen or the like has been widely used, and user authentication using handwritten information (e.g., a digital signature) may also be used. Therefore, handwriting characteristics of handwritten data may be subject to protection as personal information as much as biometric information (e.g., a fingerprint, an iris, a face, or a voice).

Various embodiments of the disclosure may provide an electronic device capable of masking and providing handwritten information when a user handwrites such that such that a personal handwriting characteristic does not appear, and a method for masking handwritten information in an electronic device.

Various embodiments of the disclosure may provide an electronic device which, when receiving handwritten information masked such that a personal handwriting characteristic does not appear, is capable of unmasking the masked handwritten information to acquire an original handwritten information before masking, and a method for unmasking handwritten information in an electronic device.

According to various embodiments, an electronic device may include a display, a memory, and at least one processor operatively connected to the display and the memory, wherein the at least one processor is configured to acquire, based on input of first handwritten information, first personalized feature data corresponding to a first personalized feature from the first handwritten information, acquire, from the first handwritten information, first content data from which the first personalized feature has been removed, encode the first personalized feature data, acquire first masked handwritten information based on the encoded first personalized feature data and the first content data, and provide the first masked handwritten information on the display.

According to various embodiments, a method for masking handwritten information in an electronic device may include acquiring, based on input of first handwritten information, first personalized feature data corresponding to a first personalized feature from the first handwritten information, acquiring, from the first handwritten information, first content data from which the first personalized feature has been removed, encoding the first personalized feature data, acquiring first masked handwritten information based on the encoded first personalized feature data and the first content data, and providing the first masked handwritten information on a display of the electronic device.

According to various embodiments, in a non-transitory storage medium storing commands, the commands may be configured to cause, when being executed by at least one processor, the at least one processor to perform at least one operation, and the at least one operation may include acquiring, based on input of first handwritten information, first personalized feature data corresponding to a first personalized feature from the first handwritten information, acquiring, from the first handwritten information, first content data from which the first personalized feature has been removed, encoding the first personalized feature data, acquiring first masked handwritten information based on the encoded first personalized feature data and the first content data, and providing the first masked handwritten information on a display of the electronic device.

According to various embodiments, when a user performs handwriting, handwritten information may be masked such that an individual's handwriting characteristic does not appear and then provided, thereby preventing the exposure of personal information due to the handwritten information.

According to various embodiments, when handwritten information, masked such that an individual's handwriting characteristic does not appear, is received, the masked handwritten information may be unmasked to acquire original handwritten information before masking, so that only an authorized user can unmask the masked handwritten information and use the unmasked handwritten information.

Effects and advantages acquirable from the disclosure are not limited to the above-mentioned effects and advantages, and other effects and advantages, which have not been described, may be clearly understood from the description below.

BRIEF DESCRIPTION OF THE DRAWINGS

The above and other aspects, features and advantages of certain embodiments of the present disclosure will be more apparent from the following detailed description, taken in conjunction with the accompanying drawings, in which.

In describing the drawings, identical or similar reference numerals may be used for identical or similar elements.

DETAILED DESCRIPTION

The terms used herein are merely for the purpose of describing particular embodiments, and are not intended to limit the scope of other embodiments. As used herein, singular forms may include plural forms as well unless the context clearly indicates otherwise. Unless defined otherwise, all terms used herein, including technical and scientific terms, may have the same meaning as those commonly understood by those skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined herein. In some cases, even terms defined herein should not be interpreted to exclude embodiments of the disclosure.

Figure 1:
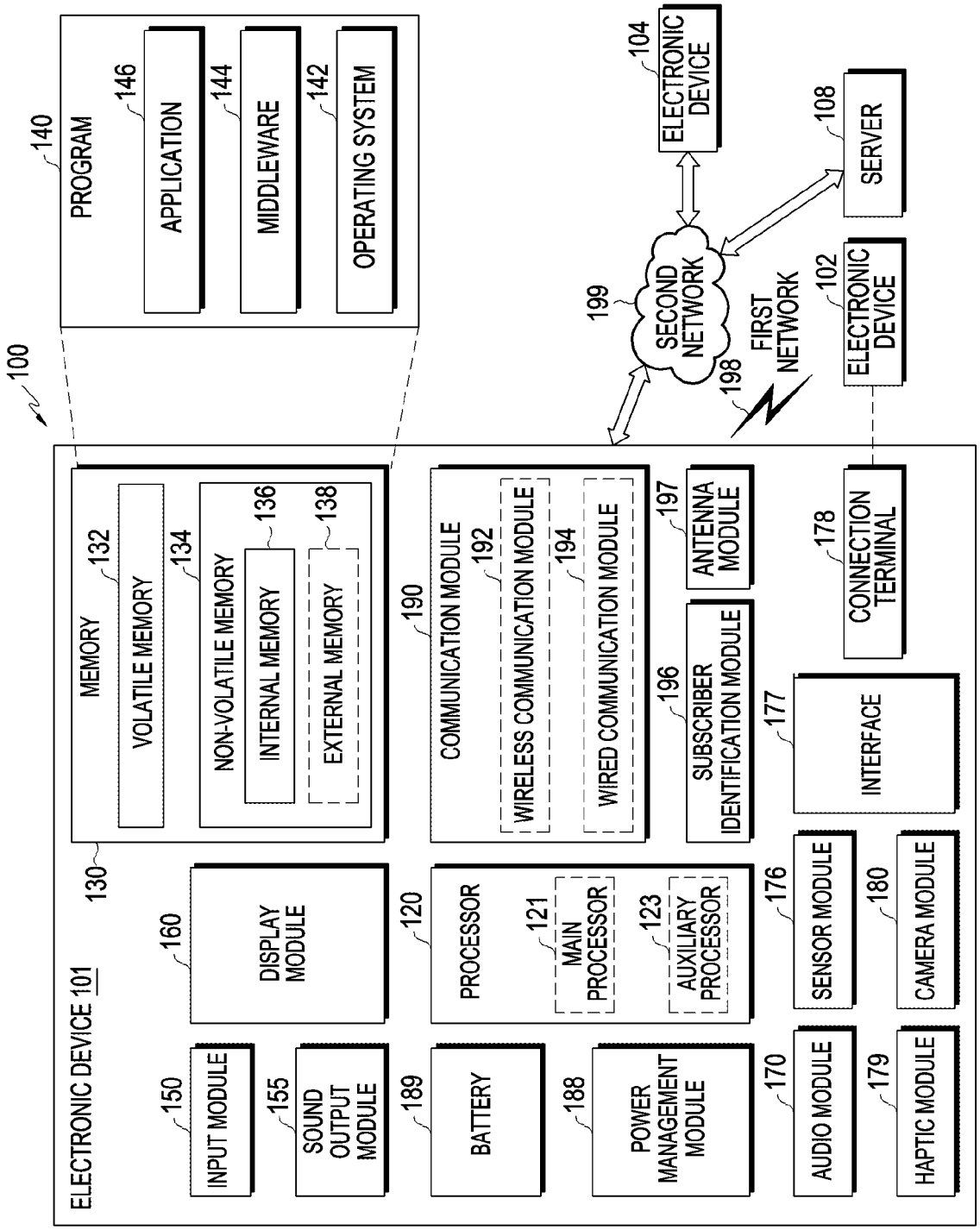
FIG. 1 is a block diagram of an example electronic device in a network environment according to an embodiment.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In some embodiments, at least one of the components (e.g., the connection terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). According to an embodiment, the connection terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
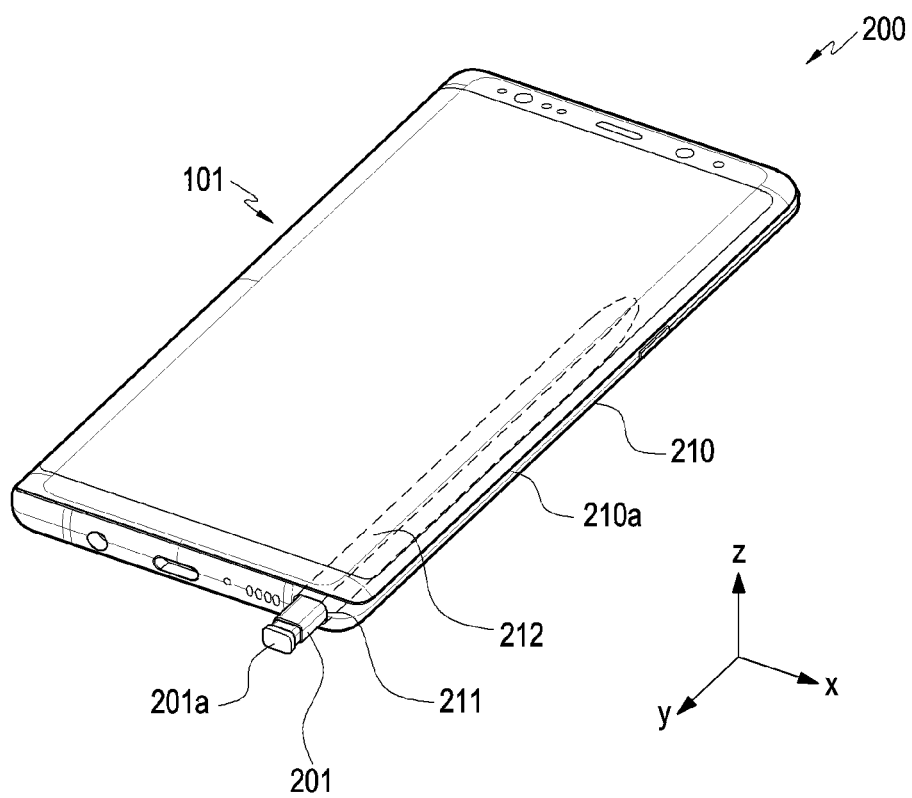
FIG. 2 is a perspective view of an example electronic device including a stylus pen according to an embodiment.

FIG. 2 is a perspective view 200 of an example electronic device including a stylus pen according to an embodiment.

Referring to FIG. 2, an electronic device 101 according to an embodiment may include the elements illustrated in FIG. 1, and may include a structure in which a stylus pen 201 can be inserted. The electronic device 101 may include a housing 210, and a part of the housing 210, for example, a part of a side surface 210a may include a hole 211. The electronic device 101 may include a first inner space 212 which is a receiving space connected to the hole 211, and the stylus pen 201 may be inserted into the first inner space 212. According to the illustrated embodiment, the stylus pen 201 may include, at one end thereof, a first button 201a which is capable of being pushed and allows the stylus pen 201 to be easily taken out of the first inner space 212 of the electronic device 101. When the first button 201a is pushed, a repulsion mechanism (for example, a repulsion mechanism by at least one elastic member (e.g., a spring)) configured to be linked with the first button 201a may operate, and thus the stylus pen 201 may be separated from the first inner space 212.

According to an embodiment, the electronic device 101 may include a structure in which the stylus pen 201 can be attached to the electronic device 101. For example, the electronic device 101 may include at least one magnetic body in a position adjacent to an attachment region such that the stylus pen 201 can be attached to the outside of the housing 210. The stylus pen 201 may be attached to the outside of the housing 210 of the electronic device 101 through the at least one magnetic body.

According to an embodiment, the stylus pen 201 may be separately configured and used without being inserted into or attached to the electronic device 101, and the electronic device 101 may not include a structure into which the stylus pen 201 may be inserted.

Figure 3:
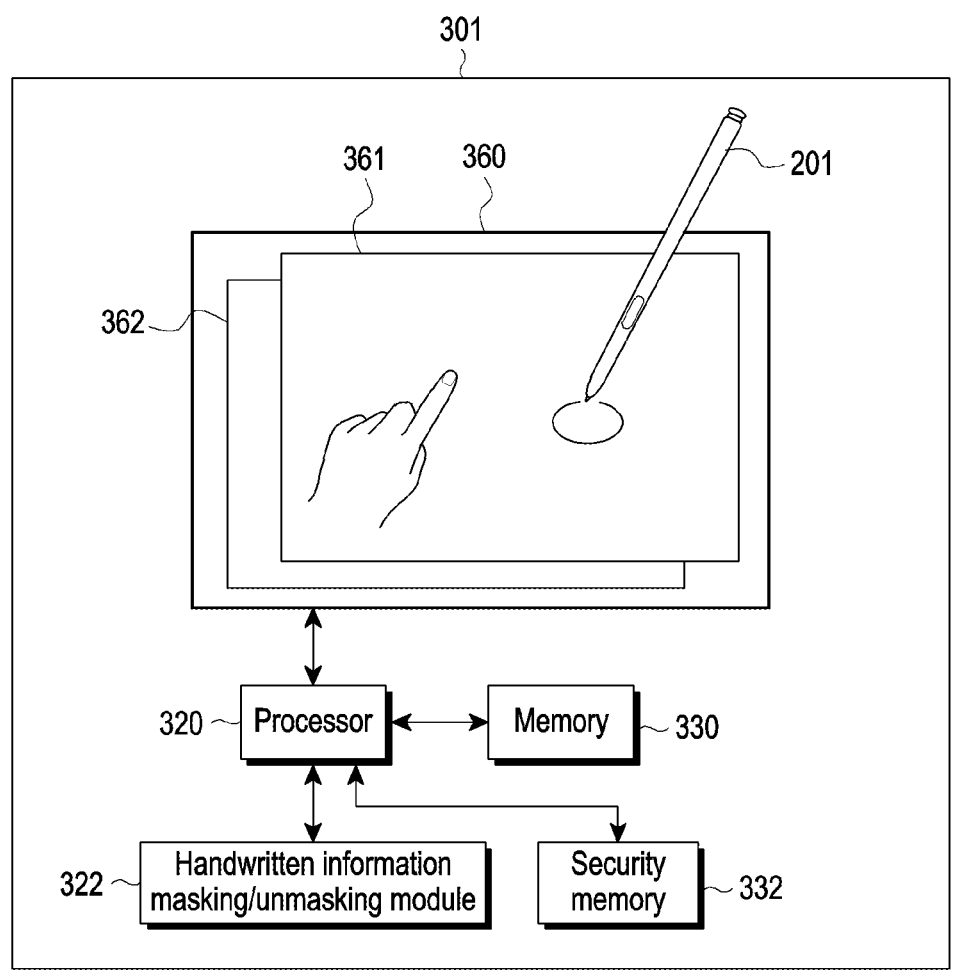
FIG. 3 is a block diagram of an example electronic device according to an embodiment.

FIG. 3 is a block diagram of an example electronic device according to an embodiment.

Referring to FIG. 3, an electronic device 301 (e.g., the electronic device 101 in FIG. 1 or the electronic device 201 in FIG. 2) according to an embodiment may include a processor 320 (e.g., including processing circuitry), a handwritten information masking/unmasking module 322, a memory 330, a security memory 332, and/or a display 360.

The display (or the display device) 360 (e.g., the display device 160 in FIG. 1) according to an embodiment may not only support data input/output functions, but also may sense a touch. The display 360 according to an embodiment may include a sensing panel 361 and a display panel 362. In FIG. 3, the sensing panel 361 is described as being included in the display 360, but may operate in a state in which the sensing panel 361 forms a layer structure with the display panel 362, but is not included in the display 360.

The sensing panel 361 according to an embodiment may detect the position of a touch input of the stylus pen 201, and the display panel 362 may output display information (e.g., text, signatures, drawings, or other displayable information). The display 360 according to an embodiment may further include a driving circuit (not shown) for controlling the display panel 362 in order to output display information through the display panel 362. When the stylus pen 201 supports an electro-magnetic resonance (EMR), the sensing panel 361 according to an embodiment may be formed as an EMR-type or electro-magnetic interface (EMI)-type input pad using an electromagnetic sensor. This is merely an example, and the sensing panel 361 may be formed as an electrically coupled resonance (ECR)-type or other-type input pad. The sensing panel 361 according to an embodiment may receive a magnetic field applied from the stylus pen 201, and may detect the position of the stylus pen 201 therefrom. The sensing panel 361 may include one or more panels, which form a layered structure with each other, in order to sense an input using multiple sensors. The sensing panel 361 according to an embodiment may be implemented as a touch screen panel (TSP), and when being implemented as a touch screen panel, may determine the position of the stylus pen 201, based on an output signal from an electrode. The stylus pen 201 according to an embodiment may also be implemented as an active electrostatic (AES) type, and it will be understood by those skilled in the art that there is no limitation on the type of implementation thereof. The sensing panel 361 according to an embodiment may sense contact or approach of a human body (e.g., a user's finger) in addition to the stylus pen 201. For example, the sensing panel 361 may sense an input (e.g., a touch-down, touch-move, or touch-up input and/or other touch gestures) by the stylus pen 201 or the user's finger. The sensing panel 361 may generate an input signal corresponding to the input by the stylus pen 201 or the user's finger, and may transmit the input signal to the processor 320. For example, the sensing panel 361 may transmit, based on a touch-move (e.g., drawing) input after touchdown, touch points (touch points at 3 ms intervals (e.g., 120 touch points per second)) to the processor 320 at designated time intervals. The display panel 362 according to an embodiment may receive display data from the processor 320 and may display the display data. For example, the display panel 362 may display an application screen according to the execution of an application (e.g., a memo application, a signature application, a sketch (or drawing) application, and/or other applications related to other pen inputs) from the processor 320, and may display at least one stroke data on the application screen. The configuration of the display 360 illustrated in FIG. 3 is merely one example, and the types and the number of panels constituting the display 360 and the upper/lower-layer positions of the panels may be variously changed depending on technology of the manufacturing the electronic device 101.

According to an embodiment, the processor 320 may receive, from the sensing panel 361, an input signal (e.g., a touch-down, touch-move, or touch-up input signal, or other pen or finger input signals) by the stylus pen 201 or the human body (e.g., the user's finger). For example, the processor 320 may receive, based on a touch-move (e.g., drawing) input after touchdown, touch points (e.g., touch points at 3 ms intervals or 120 touch points per second)) at designated time intervals from the sensing panel 361. The processor 320 according to an embodiment may identify at least one stroke, based on the touch points received from the sensing panel 361 at the designated time intervals. The processor 320 according to an embodiment may identify, based on the at least one stroke, a point feature vector set corresponding to each stroke. For example, the point feature vector set may include a pen up/down feature, a time stamp, x and y coordinates, pressure, tilt, or other point-related features. The processor 320 according to an embodiment may identify handwritten information including the at least one stroke, and may identify the type of handwritten information using at least one point feature vector set corresponding to the at least one stroke, and may identify input of the handwritten information. The processor 320 according to an embodiment may use the handwritten information masking/unmasking module 322 to mask handwritten information or may unmask masked handwritten information.

The handwritten information masking/unmasking module 322 according to an embodiment may, for example, be a software module executed by the processor 320. According to an embodiment, the handwritten information masking/unmasking module 322 may be included in the processor 320 or included in the electronic device 301 separately from the processor 320 to operate under control of the processor 320. Alternatively, the handwritten information masking/unmasking module 322 may be a hardware module which exists independently of the processor 320. The handwritten information masking/unmasking module 322 according to an embodiment may perform handwritten information masking, or may perform unmasking of masked handwritten information. The handwritten information masking/unmasking module 322 according to an embodiment may include a handwritten information masking module and/or a handwritten information unmasking module, and the processor 320 may, for example, perform masking of handwritten information (e.g., first handwritten information) that is input through the handwritten information masking module, and may use the handwritten information unmasking module to perform unmasking of previously masked handwritten information (e.g., masked second handwritten information).

The processor 320 according to an embodiment may identify the type of input handwritten information when performing handwritten information masking using the handwritten information masking/unmasking module 322. For example, the processor 320 may identify whether the type of input handwritten information is text, a signature, or a drawing. The processor 320 according to an embodiment may distinguish and identify (or separate), based on the identified type of handwritten information, a personalized feature and content (or non-personalized data) of the handwritten information from the handwritten information (e.g., the first handwritten information). For example, the processor 320 may identify, based on the identified type of handwritten information, a personalized feature of the handwritten information from the handwritten information, and may acquire personalized feature data from the handwritten information. For example, the personalized feature data of the handwritten information may include the shape of a symbol or a letter or a drawn object, the x-y ratio of the handwritten information, the size of the handwritten information (e.g., a large size, a medium size, or a small size), the slope of the handwritten information (e.g., a left slope, a right slope, vertical or not, and/or slope variation), the skew of the handwritten information (e.g., an angle from the x-axis and/or angle from the y-axis), the cursive script of the handwritten information, the space between symbols of the handwritten information, pressure applied by a pen tip during the input of the handwritten information, the azimuth of a pen relative to an input surface during the input of the handwritten information, the elevation angle (tilt) of the pen relative to the input surface during the input of the handwritten information, and/or the speed and acceleration of writing of the handwritten information. According to an embodiment, the processor 320 may store the personalized feature data of the handwritten information in the security memory 332 or a security region in the memory 330.

According to an embodiment, the processor 320 may acquire, from the handwritten information, content data (or non-personalized data) from which a personalized feature has been removed (excluded). For example, the processor 320 may acquire text data from which a personalized feature has been removed (or excluded), signature data from which a personalized feature has been removed (or excluded), and/or drawing data from which a personalized feature has been removed (or excluded). The processor 320 according to an embodiment may encode the personalized feature data. For example, the processor 320 may encode the personalized feature data by using a designated conversion method. For example, the designated conversion method may include a deep neural network (DNN)-based conversion method. For example, the DNN-based conversion method may include conversion using an adversarial autoencoder (AAE), conversion using an AAE having a 2-stack long short-term memory (LSTM) network, or conversion using a variational autoencoder (VAE). The processor 320 according to an embodiment may acquire handwritten information masked based on the encoded personalized feature data and the content data. For example, the processor 320 may acquire masked handwritten information by applying (or merging) the encoded personalized feature data to the content data from which a personalized feature has been removed.

When performing unmasking of masked handwritten information (e.g., the masked second handwritten information) using the handwritten information masking/unmasking module 322, the processor 320 according to an embodiment may identify encoded personalized feature data and content data in the masked handwritten information. The processor 320 according to an embodiment may decode the encoded personalized feature data to acquire personalized feature data. The processor 320 according to an embodiment may acquire handwritten information unmasked based on the personalized feature data and the content data. For example, the processor 320 may apply (or merge) the personalized feature data to the content data, from which a personalized feature has been removed, to acquire handwritten information before masking (the unmasked handwritten information).

The memory 330 according to an embodiment may store various data used by at least one element (e.g., the processor 320, the handwritten information masking/unmasking module 322, or the display 360) of the electronic device 301. The data may include, for example, input data or output data on software (e.g., programs) and commands related thereto. For example, the memory 330 may store instructions for performing operations of the electronic device 301 (or the processor 320). The security memory 332 according to an embodiment may be included as a part of the memory 330 or included separately therefrom, and may store personalized feature data acquired by the processor 320 or the handwritten information masking/unmasking module 322.

According to various embodiments, an electronic device (e.g., the electronic device 101 in FIG. 1, the electronic device 200 in FIG. 2, or the electronic device 301 in FIG. 3) may include a display (e.g., the display 160 in FIG. 1 or the display 360 in FIG. 3), a memory (e.g., the memory 130 in FIG. 1 or the memory 330 in FIG. 3), and at least one processor operatively connected to the display and the memory, wherein the at least one processor (e.g., the processor 120 in FIG. 1 or the processor 320 in FIG. 3) is configured to acquire, based on input of first handwritten information, first personalized feature data corresponding to a first personalized feature from the first handwritten information, acquire, from the first handwritten information, first content data from which the first personalized feature has been removed, encode the first personalized feature data, acquire first masked handwritten information based on the encoded first personalized feature data and the first content data, and provide the first masked handwritten information on the display.

According to various embodiments, the first personalized feature data may include data corresponding to at least one among a shape of a symbol, a letter, or a drawn object included in the first handwritten information, an x-y ratio of the first handwritten information, a size of the first handwritten information, a slope of the first handwritten information, a skew of the first handwritten information, a cursive script of the first handwritten information, a space between symbols included in the first handwritten information, pressure applied by an input device during the input of the first handwritten information, an azimuth of the input device relative to an input surface during the input of the first handwritten information, an elevation angle of the input device relative to the input surface during the input of the first handwritten information, or a speed and acceleration of writing of the first handwritten information.

According to various embodiments, the electronic device may further include a secure memory, wherein the at least one processor is configured to store the first personalized feature data in the secure memory.

According to various embodiments, the at least one processor may be configured to identify a type of the first handwritten information as at least one among handwritten text information, handwritten signature information, or handwritten drawing information.

According to various embodiments, the at least one processor may be configured to paraphrase text data included in the first content data in response to the type of the first handwritten information being the handwritten text information, and acquire the first masked handwritten information, based on the encoded first personalized feature data and the paraphrased text data.

According to various embodiments, the at least one processor may be configured to acquire the first masked handwritten information, based on the encoded first personalized feature data and signature data or drawing data included in the first content data, in response to the type of the first handwritten information being the handwritten signature information or handwritten drawing information.

According to various embodiments, the at least one processor may be configured to encode the first personalized feature data using a deep neural network (DNN)-based conversion-type encoder.

According to various embodiments, the DNN-based conversion-type encoder may include an adversarial autoencoder (AAE) or a variational autoencoder (VAE).

According to various embodiments, the at least one processor may be configured to identify, based on input of second masked handwritten information, encoded second personalized feature data and second content data from the second masked handwritten information, decode the encoded second personalized feature data, acquire unmasked second handwritten information based on the decoded second personalized feature data and the second content data, and provide the unmasked second handwritten information on the display.

According to various embodiments, the at least one processor may be configured to de-paraphrase text data included in the second content data in response to a type of the second masked handwritten information being handwritten text information, and acquire the unmasked second handwritten information, based on the decoded second personalized feature data and the de-paraphrased text data.

Figure 4:
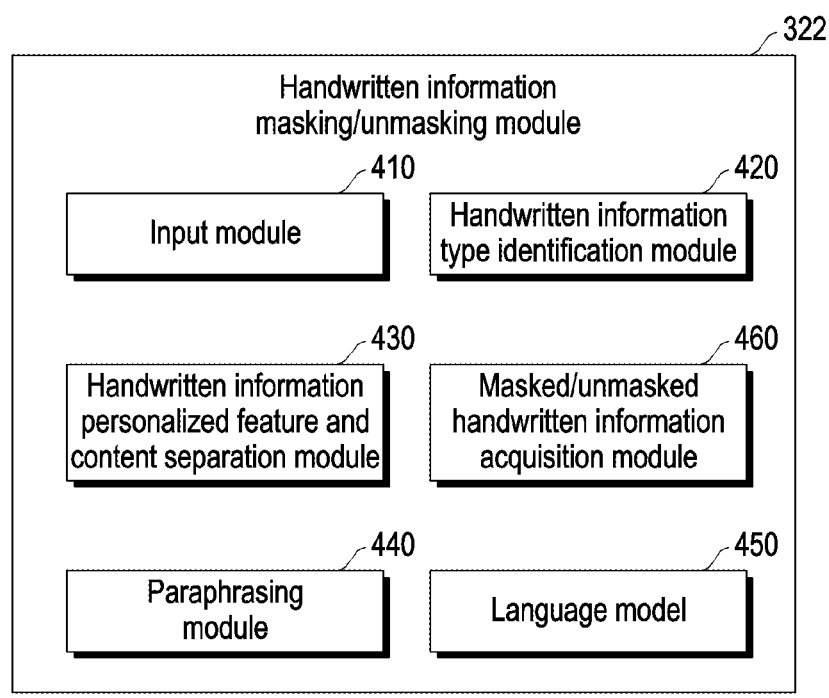
FIG. 4 is a block diagram of an example handwritten information masking/unmasking module according to an embodiment.

FIG. 4 is a block diagram of an example handwritten information masking/unmasking module according to an embodiment.

Referring to FIG. 4, the handwritten information masking/unmasking module 322 (or a handwritten information masking/unmasking system) according to an embodiment may, for example, be a software module executed by the processor 320 or may be a system or a module, which operates separately from the processor 320. The handwritten information masking/unmasking module 322 according to an embodiment may include an input module 410, a handwritten information type identification module 420, a handwritten information personalized feature and content separation module 430, a paraphrasing module 440, a language model 450, and/or a masked/unmasked handwritten information acquisition module 460. For example, each of the input module 410, the handwritten information type identification module 420, the handwritten information personalized feature and content separation module 430, the paraphrasing module 440, the language model 450, and/or the masked/unmasked handwritten information acquisition module 460 may be, for example, a software module, and may be a module of a functional unit included in the handwritten information masking/unmasking module 322.

The input module 410 according to an embodiment may receive an input of handwritten information to be masked, or may receive an input of masked handwritten information to be unmasked. For example, the input module 410 may receive handwritten information which is input through a stylus pen or a finger, or may receive masked handwritten information from an external device through communication.

The handwritten information type identification module 420 according to an embodiment may identify a type of handwritten information or masked handwritten information that has been input through the input module 410. For example, the processor 320 may identify whether the type of the input handwritten information or masked handwritten information is text, a signature, or a drawing.

The handwritten information personalized feature and content separation module 430 according to an embodiment may separate, based on the identified type of handwritten information, a personalized feature and a content (or non-personalized data) of the handwritten information from the handwritten information. For example, the handwritten information personalized feature and content separation module 430 may identify, based on the identified type of handwritten information, a personalized feature of the handwritten information from the handwritten information, and may acquire personalized feature data from the handwritten information. For example, the personalized feature data of the handwritten information may include a shape of a symbol, a letter, or a drawn object, an x-y ratio of the handwritten information, a size of the handwritten information (e.g., a large size, a medium size, or a small size), a slope of the handwritten information (e.g., a left slope, a right slope, vertical or not, and/or slope variation), a skew of the handwritten information (e.g., an angle from the x-axis and/or an angle from the y-axis), a cursive script of the handwritten information, a space between symbols of the handwritten information, pressure applied by a pen tip during the input of the handwritten information, an azimuth of a pen relative to an input surface during the input of the handwritten information, an elevation angle (tilt) of the pen relative to the input surface during the input of the handwritten information, and/or a speed and acceleration of writing of the handwritten information. According to an embodiment, the handwritten information personalized feature and content separation module 430 may store the personalized feature data of the handwritten information in the security memory 332 or a security region in the memory 330. According to an embodiment, the handwritten information personalized feature and content separation module 430 may acquire, from the handwritten information, content data (or non-personalized data) from which a personalized feature has been removed (or excluded). For example, the handwritten information personalized feature and content separation module 430 may acquire text data from which a personalized feature has been removed (or excluded), signature data from which a personalized feature has been removed (or excluded), and/or drawing data from which a personalized feature has been removed (or excluded).

When text data is acquired as the content data from the handwritten information personalized feature and content separation module 430, the paraphrasing module 440 according to an embodiment may paraphrase the text data. For example, the paraphrasing may be rewriting text while recognizing the meaning of text data. For example, the paraphrasing module 440 may acquire atomic linguistic elements from the acquired text data, may select at least one paraphrasing candidate for each linguistic element, may acquire a combination of the at least one paraphrasing candidate and linguistic scores of the at least one paraphrasing candidate, may compare the linguistic scores with input text data to select a paraphrasing candidate having a most similar linguistic score, and may provide the selected paraphrasing candidate to the masked/unmasked handwritten information acquisition module 460 such that the selected paraphrasing candidate is used to mask text data. Furthermore, the paraphrasing module 440 may store text mapping information between the selected paraphrasing candidate and the text data in the security memory 332, and may allow the text mapping information to be used when unmasking the text data later.

When acquiring text data of "What are some benefits ways to lose 5 pounds in 2 weeks?", the paraphrasing module 440 according to an embodiment may select "What are some opinion ways to lose 5 pounds in 2 weeks?" as a first paraphrasing candidate and "What are some alternative ways to lose 5 pounds in 2 weeks?" as a second paraphrasing candidate, may select, from among the selected paraphrasing candidates, a paraphrasing candidate having a linguistic score most similar the text data, may provide the selected paraphrasing candidate as content data to the masked/unmasked handwritten information acquisition module 460 such that the selected paraphrasing candidate is used to mask the text data.

The language model 450 according to an embodiment may provide a language model necessary for acquiring, by the paraphrasing module 440, atomic linguistic elements and paraphrasing elements from text data. For example, the language model may include a language model corresponding to English, Korean, Chinese, Arabic, Spanish, Japanese, or other languages commonly used in the world.

The masked/unmasked handwritten information acquisition module 460 according to an embodiment may encode personalized feature data when performing masking and may acquire masked handwritten information using the encoded personalized feature data and content data. For example, when masking handwritten information, the masked/unmasked handwritten information acquisition module 460 may encode personalized feature data using a designated conversion method. For example, the designated conversion method may include a deep neural network (DNN)-based conversion method. For example, the DNN-based conversion method may include conversion using adversarial autoencoder (AAE), conversion using an AAE having 2-stack long short-term memory (LSTM) network, or conversion using a variational autoencoder (VAE). The masked/unmasked handwritten information acquisition module 460 according to an embodiment may acquire masked handwritten information, based on the encoded personalized feature data and the content data. For example, the masked/unmasked handwritten information acquisition module 460 may acquire the masked handwritten information by applying (merging) the encoded personalized feature data to content data from which a personalized feature has been removed. The masked/unmasked handwritten information acquisition module 460 according to an embodiment may decode the encoded personalized feature data when performing unmasking, and may use the decoded personalized feature data and the content data to acquire unmasked handwritten information. In an embodiment, the masked/unmasked handwritten information acquisition module 460 may decode encoded personalized feature data identified in masked handwritten information to acquire personalized feature data, and may acquire unmasked handwritten information, based on the personalized feature data and the content data. For example, the masked/unmasked handwritten information acquisition module 460 may acquire handwritten information before masking (unmasked handwritten information) by applying (merging) the decoded personalized feature data to content data from which a personalized feature has been removed.

Figure 5:
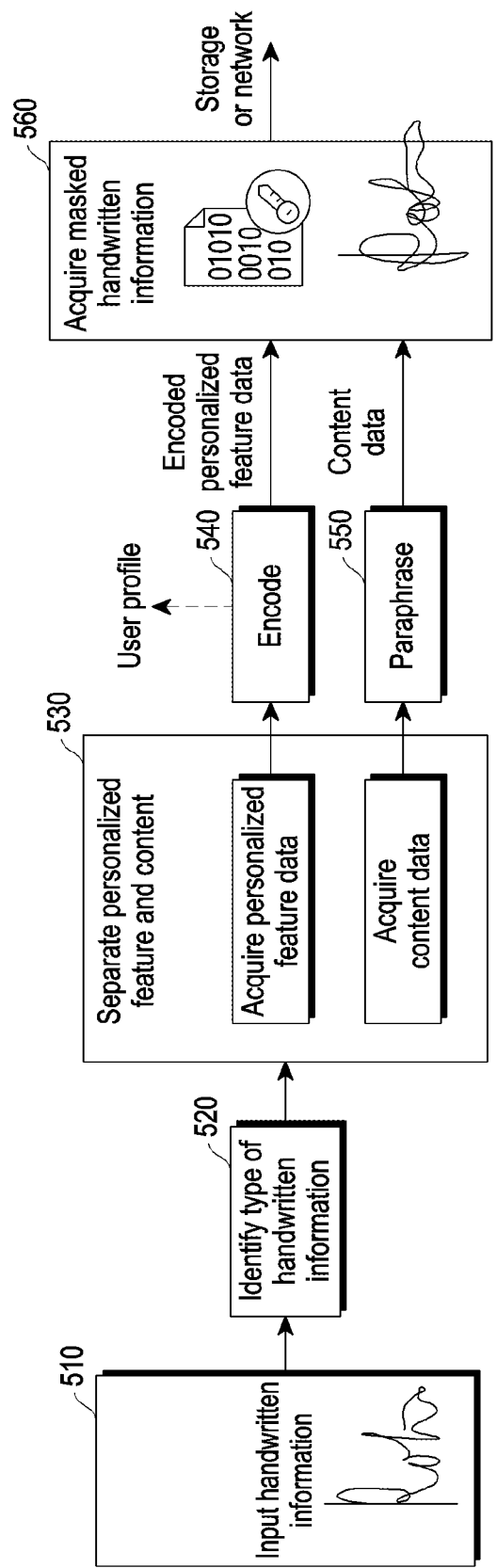
FIG. 5 illustrates a handwritten information masking operation using an example handwritten information masking/unmasking module according to an embodiment.

FIG. 5 illustrates a handwritten information masking operation using an example handwritten information masking/unmasking module according to an embodiment.

Referring to FIG. 5, the handwritten information masking/unmasking module 322 (or the processor 320, hereinafter described as an operation of the processor 320) according to an embodiment may perform a handwritten information input operation 510, a handwritten information type identification operation 520, a personalized feature and content separation operation 530, an encoding operation 540, a paraphrasing operation 550, and/or a masked handwritten information acquisition operation 560.

The processor 320 according to an embodiment may receive an input of handwritten information such as (e.g., also referred to as handwritten information of Roh) (510), and when the handwritten information is input, may identify the type of the handwritten information (520). For example, the processor 320 may identify that the type of handwritten information of Roh is text among text, a signature, and a drawing. The processor 320 according to an embodiment may separate a personalized feature and a content with respect to the text-type handwritten information (530). For example, the processor 320 may identify personalized feature data from the handwritten information of Roh. For example, the personalized feature data of the handwritten information may include the shape of the handwritten information of Roh, the x-y ratio of the handwritten information of Roh, the size of the handwritten information of Roh (e.g., a large size, a medium size, or a small size), the slope of the handwritten information of Roh (e.g., a left slope, a right slope, vertical or not, and/or slope variation), the skew of the handwritten information of Roh (e.g., an angle from the x-axis and/or an angle from the y-axis), the cursive script of the handwritten information of Roh, the space between letters of the handwritten information of Roh, pressure applied by a pen tip during the input of the handwritten information of Roh, the azimuth of a pen relative to an input surface during the input of the handwritten information of Roh, the elevation angle (tilt) of the pen relative to the input surface during the input of the handwritten information of Roh, and/or the speed and acceleration of writing of the handwritten information of Roh.

According to an embodiment, the processor 320 may acquire, from the handwritten information of Roh, content data (or non-personalized data) from which a personalized feature has been removed (excluded). For example, the processor 320 may acquire "Roh", which is text data, as the content data from which a personalized feature has been excluded (or removed).

According to an embodiment, the processor 320 may store the personalized feature data of the handwritten information of Roh in the form of a user profile in the security memory 332 or a security region of the memory 330, and may encode the personalized feature data of the handwritten information of Roh (540).

According to an embodiment, the processor 320 may paraphrase "Roh", which is text data, as the content data from which a personalized feature has been excluded (or removed) (550). The processor 320 may omit the paraphrasing operation.

According to an embodiment, the processor 320 may acquire masked handwritten information, based on the encoded personalized feature data and the content data (560). For example, the processor 320 may apply (merge) the encoded personalized feature data to the content data, from which a personalized feature has been excluded, to acquire ᏰᏰ (e.g., also referred to as masked handwritten information of Roh') which is masked handwritten information. According to an embodiment, the processor 320 may store the masked handwritten information of Roh' in a storage (e.g., the memory 330 or the security memory 332), or may transmit the masked handwritten information of Roh' to the outside through a network.

Figure 6:
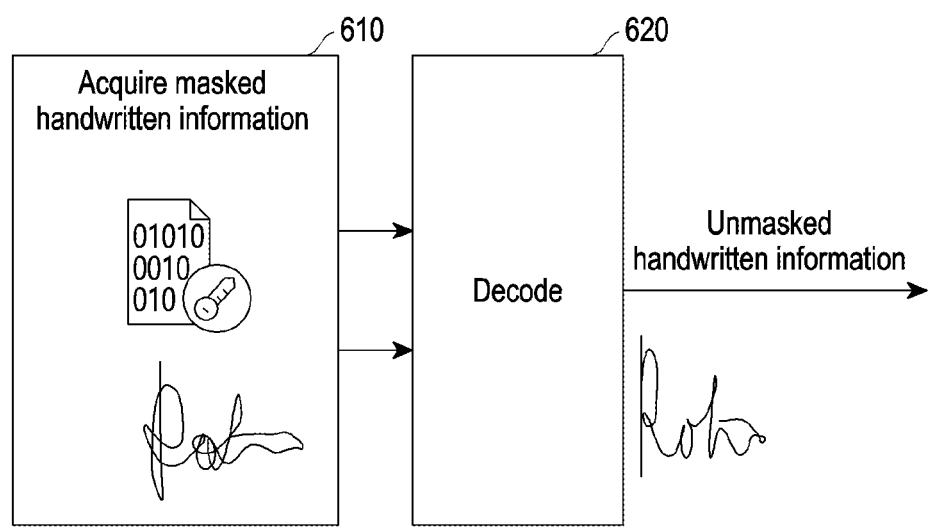
FIG. 6 illustrates a handwritten information unmasking operation using an example handwritten information masking/unmasking module according to an embodiment.

FIG. 6 illustrates a handwritten information unmasking operation using an example handwritten information masking/unmasking module according to an embodiment.

Referring to FIG. 6, the handwritten information masking/unmasking module 322 (or the processor 320, hereinafter described as an operation of the processor 320) according to an embodiment may perform a masked data acquisition operation 610 and a decoding operation 620.

The processor 320 according to an embodiment may acquire masked handwritten information of Roh' (610). For example, the processor 320 may acquire masked handwritten information from the outside through communication or through an input from the outside, or may acquire pre-stored masked handwritten information.

The processor 320 according to an embodiment may identify encoded personalized feature data and content data from the masked handwritten information of Roh'. The processor 320 according to an embodiment may decode the encoded personalized feature data and/or the content data which have been identified (620), and may acquire unmasked handwritten information, based on the decoded personalized feature data and the decoded content data. For example, the processor 320 may apply (or merge) the decoded personalized feature data to the content data, from which a personalized feature has been removed, to acquire handwritten information of Roh which is handwritten information before masking (unmasked handwritten information).

Figure 7:
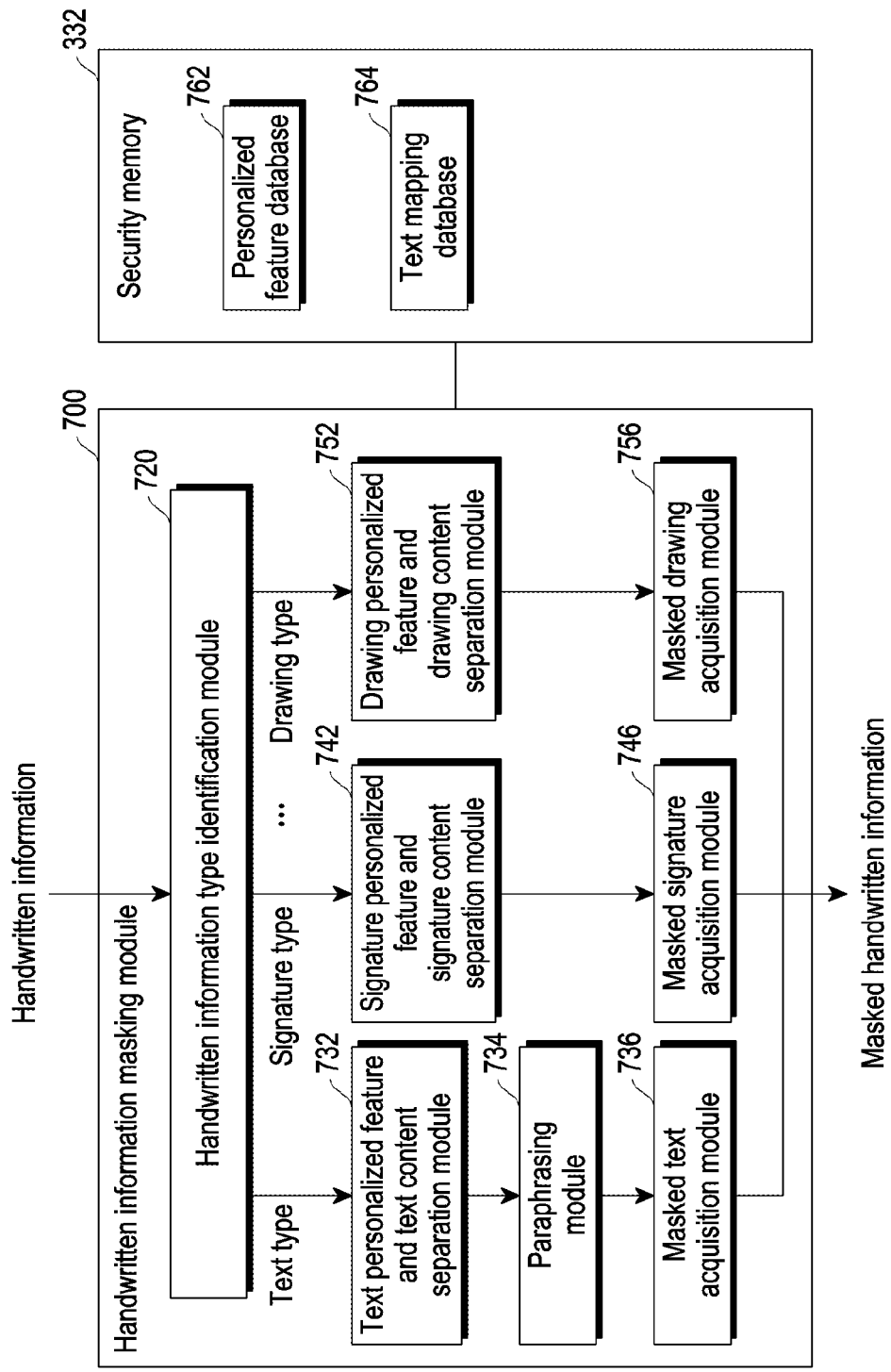
FIG. 7 illustrates an example of the configuration of a handwritten information masking module according to an embodiment.

FIG. 7 illustrates an example of the configuration of a handwritten information masking module according to an embodiment.

Referring to FIG. 7, the handwritten information masking/unmasking module 322 according to an embodiment may include a handwritten information masking module 700. The handwritten information masking module 700 according to an embodiment may include a handwritten information type identification module 720, a text personalized feature and text content separation module 732, a paraphrasing module 734, a masked text acquisition module 736, a signature personalized feature and signature content separation module 742, a masked signature acquisition module 746, a drawing personalized feature and drawing content separation module 752, and/or a masked drawing acquisition module 756.

The handwritten information type identification module 720 according to an embodiment may identify the type of input handwritten information. For example, the handwritten information type identification module 720 may identify whether the type of the input handwritten information is text, a signature, or a drawing.

The text personalized feature and text content separation module 732 according to an embodiment may separate, based on a fact that the identified type of the handwritten information is a text type, a personalized feature of the text-type handwritten information and text data from the text-type handwritten information. For example, personalized feature data of the text-type handwritten information may include a shape of a symbol (or a letter), an x-y ratio of text, a size of the text (e.g., a large size, a medium size, or a small size), a slope of the text (e.g., a left slope, a right slope, vertical or not, and/or slope variation), a skew of the text (e.g., an angle from the x-axis and/or an angle from the y-axis), a cursive script of the text, a space between letters of the text, pressure applied by a pen tip during the input of the text, an azimuth of a pen relative to an input surface during the input of the text, an elevation angle (tilt) of the pen relative to the input surface during the input of the text, and/or a speed and acceleration of writing of the text. According to an embodiment, the text personalized feature and text content separation module 732 may store the personalized feature data of the text in a personalized feature database 762 of the security memory 332. According to an embodiment, the text personalized feature and text content separation module 732 may acquire, from the handwritten text information, text data from which a personalized feature has been excluded (or removed). The paraphrasing module 734 according to an embodiment may paraphrase the text data. For example, the paraphrasing may be rewriting text while recognizing the meaning of text data. For example, the paraphrasing module 734 may acquire atomic linguistic elements from the acquired text data, may select at least one paraphrasing candidate for each linguistic element, may acquire a combination of the at least one paraphrasing candidate and linguistic scores of the at least one paraphrasing candidate, may compare the linguistic scores with input text data to select a paraphrasing candidate having a most similar linguistic score, and may provide the selected paraphrasing candidate to the masked text acquisition module 736 such that the selected paraphrasing candidate is used to mask the text data. Furthermore, the paraphrasing module 734 may store text mapping data between the selected paraphrasing candidate and the text data in a text mapping database 764 of the security memory 332, and may allow the stored text mapping data to be used when unmasking the masked text data. The masked text acquisition module 736 according to an embodiment may encode the personalized feature data, and may acquire masked text using the encoded personalized feature data and the text data. For example, when masking handwritten text information, the masked text acquisition module 736 may encode the personalized feature data using a designated conversion method. For example, the designated conversion method may include a deep neural network (DNN)-based conversion method. For example, the DNN-based conversion method may include conversion using adversarial autoencoder (AAE), conversion using an AAE having 2-stack long short-term memory (LSTM) network, or conversion using a variational autoencoder (VAE). The masked text acquisition module 736 according to an embodiment may acquire masked handwritten text information, based on the encoded personalized feature data and the text data. For example, the masked text acquisition module 736 may acquire the masked handwritten text information by applying (merging) the encoded personalized feature data to the text data from which a personalized feature has been excluded.

When the identified type of the handwritten information is a signature type, the signature personalized feature and signature content separation module 742 according to an embodiment may separate signature data and a personalized feature of the handwritten signature information from the handwritten signature information. For example, personalized feature data of the handwritten signature information may include a shape of a symbol (or a letter), an x-y ratio of a signature, a size of the signature (e.g., a large size, a medium size, or a small size), a slope of the signature (e.g., a left slope, a right slope, vertical or not, and/or slope variation), a skew of the signature (e.g., an angle from the x-axis and/or an angle from the y-axis), a cursive script of the signature, a space between letters of the signature, pressure applied by a pen tip during the input of the signature, an azimuth of a pen relative to an input surface during the input of the signature, an elevation angle (tilt) of the pen relative to the input surface during the input of the signature, and/or a speed and acceleration of writing of the signature. According to an embodiment, the signature personalized feature and signature content separation module 742 may store the personalized feature data of the signature in the personalized feature database 762 of the security memory 332. According to an embodiment, the signature personalized feature and signature content separation module 742 may acquire, from the handwritten signature information, signature data from which a personalized feature has been excluded (or removed). The masked signature acquisition module 746 according to an embodiment may encode the personalized feature data, and may use the encoded personalized feature data and the signature data to acquire a masked signature. For example, when masking the handwritten signature information, the masked signature acquisition module 746 may encode the personalized feature data using a designated conversion method. For example, the designated conversion method may include a deep neural network (DNN)-based conversion method. For example, the DNN-based conversion method may include conversion using adversarial autoencoder (AAE), conversion using an AAE having 2-stack long short-term memory (LSTM) network, or conversion using a variational autoencoder (VAE). The masked signature acquisition module 746 according to an embodiment may acquire masked handwritten signature information, based on the encoded personalized feature data and the signature data. For example, the masked signature acquisition module 746 may acquire the masked handwritten signature information by applying (merging) the encoded personalized feature data to the signature data from which a personalized feature has been excluded.

The drawing personalized feature and drawing content separation module 752 according to an embodiment may separate, based on a fact that the identified type of the handwritten information is a drawing type, drawing data and a personalized feature of the handwritten drawing information from the handwritten drawing information. For example, personalized feature data of the handwritten drawing information may include a shape of a drawing (or a drawn object), an x-y ratio of the drawing, a size of the drawing (e.g., a large size, a medium size, or a small size), a slope of the drawing (e.g., a left slope, a right slope, vertical or not, and/or slope variation), a skew of the drawing (e.g., an angle from the x-axis and/or an angle from the y-axis), a cursive script of the drawing, a space between objects of the drawing, pressure applied by a pen tip during the input of the drawing, an azimuth of a pen relative to an input surface during the input of the drawing, an elevation angle (tilt) of the pen relative to the input surface during the input of the drawing, and/or a speed and acceleration of writing of the drawing. According to an embodiment, the drawing personalized feature and drawing content separation module 752 may store the personalized feature data of the drawing in the personalized feature database 762 of the security memory 332. According to an embodiment, the drawing personalized feature and drawing content separation module 752 may acquire, from the handwritten drawing information, drawing data from which a personalized feature has been excluded (or removed). The masked drawing acquisition module 756 according to an embodiment may encode the personalized feature data, and may acquire a masked drawing using the encoded personalized feature data and the drawing data. For example, when masking the handwritten drawing information, the masked drawing acquisition module 756 may encode the personalized feature data using a designated conversion method. For example, the designated conversion method may include a deep neural network (DNN)-based conversion method. For example, the DNN-based conversion method may include conversion using adversarial autoencoder (AAE), conversion using an AAE having 2-stack long short-term memory (LSTM) network, or conversion using a variational autoencoder (VAE). The masked drawing acquisition module 756 may acquire masked handwritten drawing information, based on the encoded personalized feature data and the drawing data. For example, the masked drawing acquisition module 756 may acquire the masked handwritten drawing information by applying (merging) the encoded personalized feature data to the drawing data from which a personalized feature has been excluded.

Figure 8:
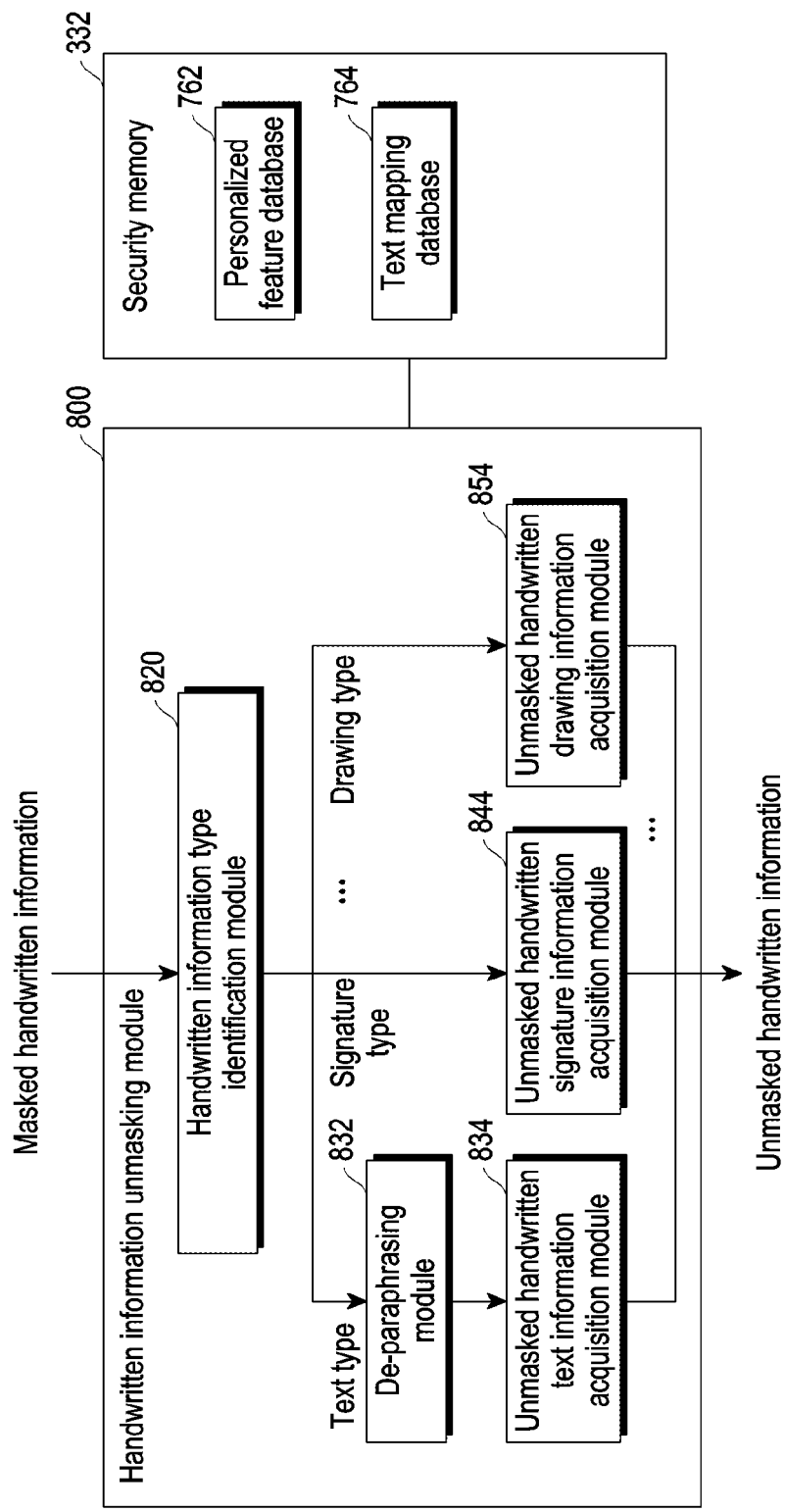
FIG. 8 illustrates an example of the configuration of a handwritten information unmasking module according to an embodiment.

FIG. 8 illustrates an example of the configuration of a handwritten information unmasking module according to an embodiment.

Referring to FIG. 8, the handwritten information masking/unmasking module 322 according to an embodiment may include a handwritten information unmasking module 800. The handwritten information unmasking module 800 according to an embodiment may include a handwritten information type identification module 820, a de-paraphrasing module 832, an unmasked handwritten text information acquisition module 834, an unmasked handwritten signature information acquisition module 844, and/or an unmasked handwritten drawing information acquisition module 854.

The handwritten information type identification module 820 according to an embodiment may identify the type of masked handwritten information which has been input (or received). For example, the handwritten information type identification module 820 may identify whether the type of the masked handwritten information which has been input is text, a signature, or a drawing.

The de-paraphrasing module 832 according to an embodiment may de-paraphrase paraphrased text data using text mapping data stored in the text mapping database 764. For example, the de-paraphrasing may be a technique for restoring text data to the original written state thereof. The unmasked handwritten text information acquisition module 834 according to an embodiment may decode encoded personalized feature data, and may acquire unmasked handwritten text information using the decoded personalized feature data and the de-paraphrased text data. For example, the unmasked handwritten text information acquisition module 834 may perform the decoding using an inverse conversion method corresponding to a designated conversion method.

The unmasked handwritten signature information acquisition module 844 according to an embodiment may decode encoded personalized feature data, and may acquire unmasked handwritten signature information using the decoded personalized feature data and signature data.

The unmasked handwritten drawing information acquisition module 854 according to an embodiment may decode encoded personalized feature data, and may acquire unmasked handwritten drawing information using the decoded personalized feature data and drawing data.

Figure 9:
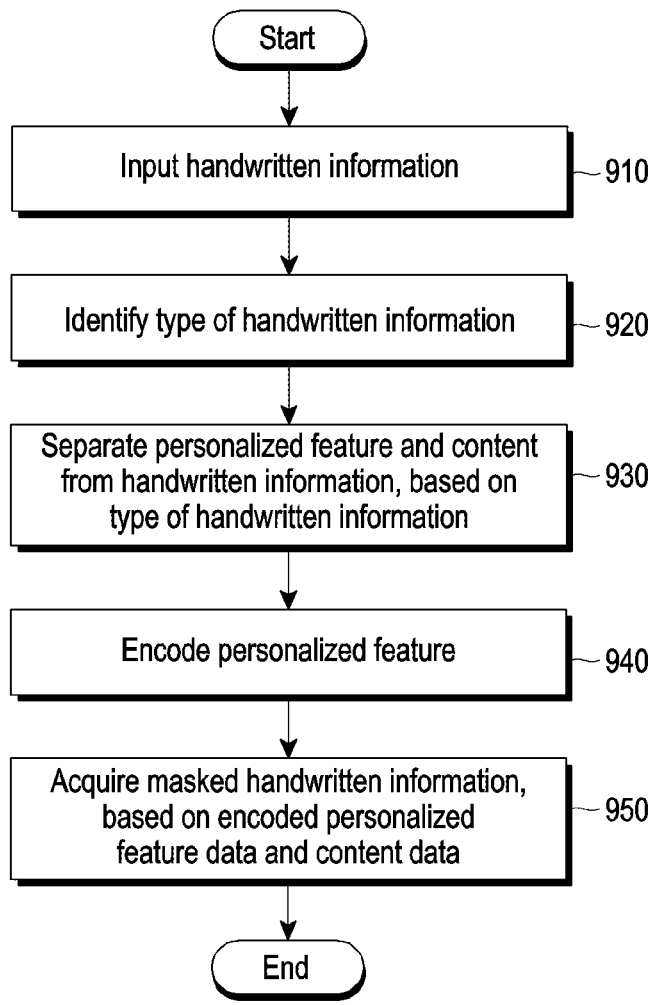
FIG. 9 is a flowchart illustrating an example handwritten information masking operation in an electronic device according to an embodiment.

FIG. 9 is a flowchart illustrating a handwritten information masking operation in an example electronic device according to an embodiment.

Referring to FIG. 9, a processor (e.g., the processor 120 in FIG. 1 or the processor 320 in FIG. 3) of an electronic device (e.g., the electronic device 101 in FIG. 1, the electronic device 200 in FIG. 2, or the electronic device 301 in FIG. 3) according to an embodiment may perform at least one of operations 910 to 950.

In operation 910, the processor 320 according to an embodiment may receive an input of handwritten information. For example, the processor 320 may receive handwritten information input by the stylus pen 201 or a finger, or may receive an input of handwritten information from an external device through the communication module 190.

In operation 920, the processor 320 according to an embodiment may identify the type of the input handwritten information. For example, the processor 320 may identify the type of the handwritten information as one of text, a signature, or a drawing.

In operation 930, the processor 320 according to an embodiment may separate (or acquire) a personalized feature and a content from the handwritten information, based on the type of the handwritten information. For example, the processor 320 may separate, based on a fact that the type of the handwritten information is a text type, text data and a personalized feature of the text-type handwritten information from the text-type handwritten information. For example, personalized feature data of the text-type handwritten information may include a shape of a symbol (or a letter), an x-y ratio of text, a size of the text (e.g., a large size, a medium size, or a small size), a slope of the text (e.g., a left slope, a right slope, vertical or not, and/or slope variation), a skew of the text (e.g., an angle from the x-axis and/or an angle from the y-axis), a cursive script of the text, a space between letters of the text, pressure applied by a pen tip during the input of the text, an azimuth of a pen relative to an input surface during the input of the text, an elevation angle (tilt) of the pen relative to the input surface during the input of the text, and/or a speed and acceleration of writing of the text. According to an embodiment, the processor 320 may acquire, from the handwritten text information, text data from which a personalized feature has been excluded (or removed). The processor 320 according to an embodiment may paraphrase the text data. For example, the paraphrasing may be rewriting text while recognizing the meaning of text data. For example, the processor 320 may acquire atomic linguistic elements from the acquired text data, may select at least one paraphrasing candidate for each linguistic element, may acquire a combination of the at least one paraphrasing candidate and linguistic scores of the at least one paraphrasing candidate, may compare the linguistic scores with input text data to select a paraphrasing candidate having a most similar linguistic score, and may allow the selected paraphrasing candidate to be used to mask the text data.

For example, the processor 320 may separate, based on a fact that the identified type of the handwritten information is a signature type, signature data and a personalized feature of the handwritten signature information from the handwritten signature information.

For example, the processor 320 may separate, based on a fact that the identified type of the handwritten information is a drawing type, drawing data and a personalized feature of the handwritten drawing information from the handwritten drawing information.

In operation 940, the processor 320 according to an embodiment may encode personalized feature data. For example, the processor 320 may encode the personalized feature data by using a designated conversion method. For example, the designated conversion method may include a deep neural network (DNN)-based conversion method. For example, the DNN-based conversion method may include conversion using adversarial autoencoder (AAE), conversion using an AAE having 2-stack long short-term memory (LSTM) network, or conversion using a variational autoencoder (VAE).

In operation 950, the processor 320 according to an embodiment may acquire masked handwritten information, based on the encoded personalized feature data and the content data. For example, the processor 320 may acquire masked handwritten information (e.g., masked handwritten text information, masked handwritten signature information, or masked handwritten drawing information) by applying (or merging) the encoded personalized feature data to the content data from which a personalized feature has been excluded (e.g., paraphrased text data, signature data, or drawing data).

Figure 10:
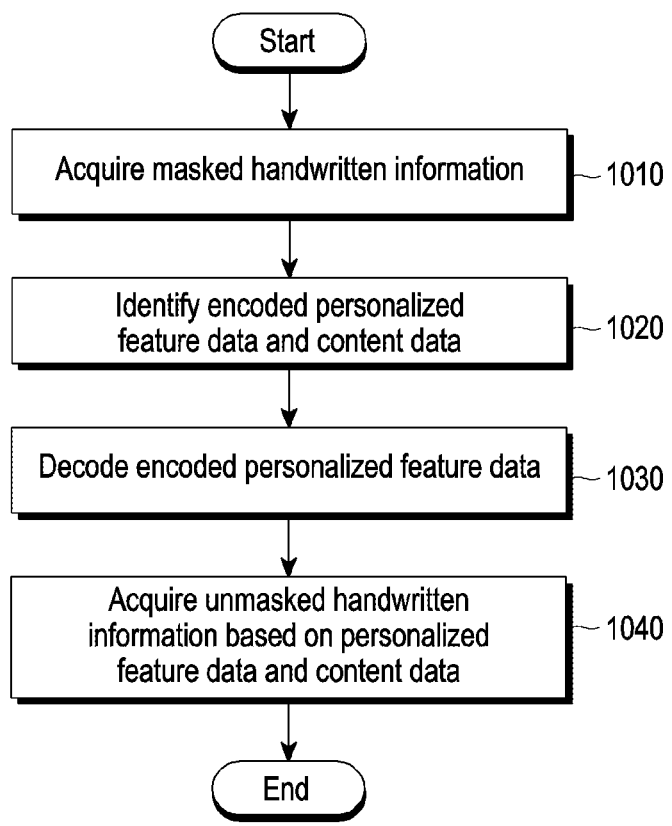
FIG. 10 illustrates an example handwritten information unmasking operation in an electronic device according to an embodiment.

FIG. 10 illustrates a handwritten information unmasking operation in an example electronic device according to an embodiment.

Referring to FIG. 10, a processor (e.g., the processor 120 in FIG. 1 or the processor 320 in FIG. 3) of an electronic device (e.g., the electronic device 101 in FIG. 1, the electronic device 200 in FIG. 2, or the electronic device 301 in FIG. 3) may perform at least one of operations 1010 to 1040.

In operation 1010, the processor 320 according to an embodiment may receive (acquire) masked handwritten information. For example, the processor 320 may acquire masked handwritten information from the outside through communication or through an input from the outside, or may acquire pre-stored masked handwritten information.

In operation 1020, the processor 320 according to an embodiment may identify encoded personalized feature data and content data from the masked handwritten information. For example, the processor 320 may identify the type of the masked handwritten information as one of text, a signature, or a drawing, and may identify, from the masked handwritten information, the encoded personalized feature data and one of text data, signature data, or drawing data as the content data.

In operation 1030, the processor 320 according to an embodiment may decode the encoded personalized feature data. If the content data is in an encoded state, the processor 320 according to an embodiment may decode the content data when decoding the encoded personalized feature data. When the content data is paraphrased text data, the processor 320 according to an embodiment may de-paraphrase the paraphrased text data.

In operation 1040, the processor 320 according to an embodiment may acquire unmasked handwritten information, based on the decoded personalized feature data and the content data. For example, the processor 320 may acquire handwritten information before masking (unmasked handwritten information) by applying (merging) the decoded personalized feature data to the content data from which a personalized feature has been excluded.

According to various embodiments, a method for masking handwritten information in an electronic device (e.g., the electronic device 101 in FIG. 1, the electronic device 200 in FIG. 2, or the electronic device 301 in as illustrated in FIG. 3) may include acquiring, based on input of first handwritten information, first personalized feature data corresponding to a first personalized feature from the first handwritten information, acquiring, from the first handwritten information, first content data from which the first personalized feature has been removed, encoding the first personalized feature data, acquiring first masked handwritten information based on the encoded first personalized feature data and the first content data, and providing the first masked handwritten information on a display of the electronic device.

According to various embodiments, the first personalized feature data may include data corresponding to at least one among a shape of a symbol (or a letter) included in the first handwritten information, an x-y ratio of the first handwritten information, a size of the first handwritten information, a slope of the first handwritten information, a skew of the first handwritten information, a cursive script of the first handwritten information, a space between symbols included in the first handwritten information, pressure applied by an input device during the input of the first handwritten information, an azimuth of the input device relative to an input surface during the input of the first handwritten information, an elevation angle of the input device relative to the input surface during the input of the first handwritten information, or a speed and acceleration of writing of the first handwritten information.

According to various embodiments, the method may further include storing the first personalized feature data in a secure memory.

According to various embodiments, the method may further include identifying a type of the first handwritten information as at least one among handwritten text information, handwritten signature information, or handwritten drawing information.

According to various embodiments, the method may further include paraphrasing text data included in the first content data in response to the type of the first handwritten information being handwritten text information, and acquiring the first masked handwritten information, based on the encoded first personalized feature data and the paraphrased text data.

According to various embodiments, the method may further include acquiring the first masked handwritten information, based on the encoded first personalized feature data and signature data or drawing data included in the first content data, in response to the type of first handwritten information being handwritten signature information or handwritten drawing information.

According to various embodiments, in the method, the first personalized feature data may be encoded by using a deep neural network (DNN)-based conversion-type encoder, and the DNN-based conversion-type encoder may include an adversarial autoencoder (AAE) or a variational autoencoder (VAE).

According to various embodiments, the method may further include identifying, based on input of second masked handwritten information, encoded second personalized feature data and second content data from the second masked handwritten information, decoding the encoded second personalized feature data, acquiring unmasked second handwritten information based on the decoded second personalized feature data and the second content data, and providing the unmasked second handwritten information on the display.

According to various embodiments, the method may further include de-paraphrasing text data included in the second content data in response to a type of the second masked handwritten information being handwritten text information, and acquiring the unmasked second handwritten information, based on the decoded second personalized feature data and the de-paraphrased text data.

Figure 11A:
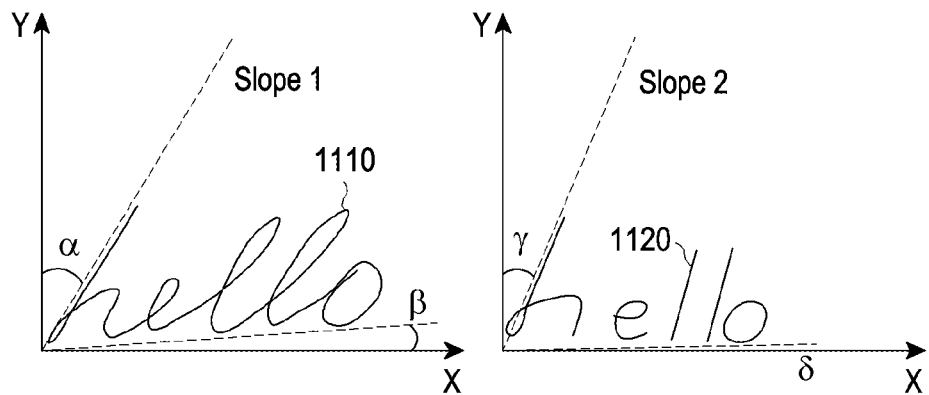
FIG. 11A illustrates an example of a personalized feature of handwritten information according to an embodiment.
Figure 11B:
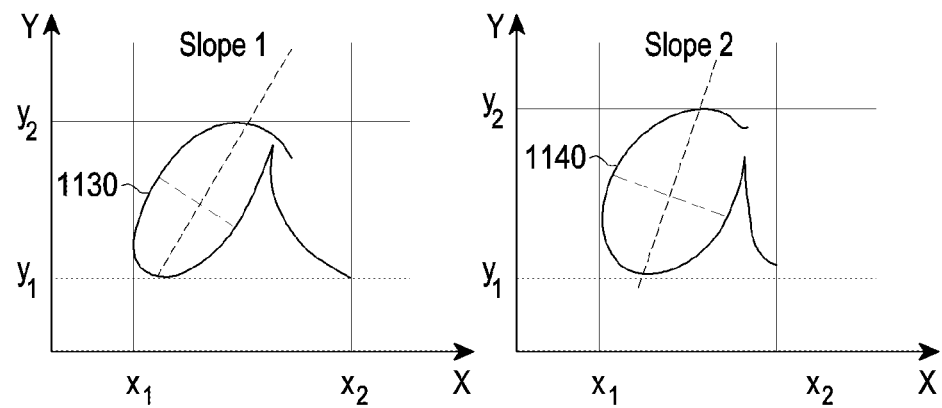
FIG. 11B illustrates an example of a letter-level personalized feature according to an embodiment.
Figure 11C:
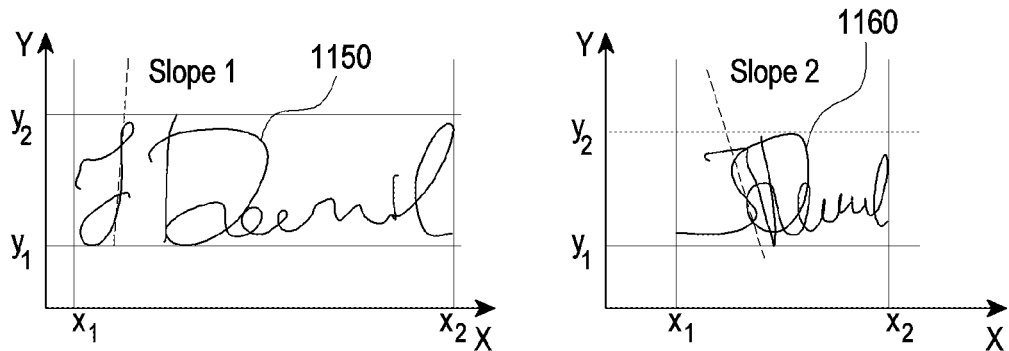
FIG. 11C illustrates an example of a personalized feature of signature-type handwritten information according to an embodiment.

FIG. 11A illustrates an example of a personalized feature of handwritten information according to an embodiment. FIG. 11B illustrates an example of a letter-level personalized feature according to an embodiment. FIG. 11C illustrates an example of a personalized feature of signature-type handwritten information according to an embodiment.

Referring to FIG. 11A, a processor (e.g., the processor 120 in FIG. 1 or the processor 320 in FIG. 3) of an electronic device (e.g., the electronic device 101 in FIG. 1, the electronic device 200 in FIG. 2, or the electronic device 301 in FIG. 3) may identify the type of the input handwritten information as text, based on the input of handwritten information such as a "hello" 1110 (e.g., *hello* ). The processor 320 according to an embodiment may separate, based on a fact that the type of the "hello" 1110 is a text type, a personalized feature and text data from the "hello" 1110. For example, the personalized feature data of the "hello" 1110 may include the shape of a symbol (or a letter), the x-y ratio of the "hello" 1110, the size of the "hello" 1110 (e.g., a large size, a medium size, or a small size), the slope (e.g., slope 1) of the "hello" 1110, the skew (e.g., α and/or β) of the "hello" 1110, the cursive script of the "hello" 1110, the space between letters of the "hello" 1110, pressure applied by a pen tip during the input of the "hello" 1110, the azimuth of a pen relative to an input surface during the input of the "hello" 1110, the elevation angle (tilt) of the pen relative to the input surface during the input of the "hello" 1110, and/or the speed and acceleration of writing of the "hello" 1110. According to an embodiment, the processor 320 may perform encoding such that the personalized feature acquired from the "hello" 1110 has a different feature. For example, the processor 320 may acquire encoded personalized data by converting, to other values, the shape of a symbol (or a letter), the x-y ratio of the "hello" 1110, the size of the "hello" 1110 (e.g., a large size, a medium size, or a small size), the slope (e.g., slope 1) of the "hello" 1110, the skew (e.g., α and/or β) of the "hello" 1110, the cursive script of the "hello" 1110, the space between letters of the "hello" 1110, pressure applied by a pen tip during the input of the "hello" 1110, the azimuth of a pen relative to an input surface during the input of the "hello" 1110, the elevation angle (tilt) of the pen relative to the input surface during the input of the "hello" 1110, and/or the speed and acceleration of writing of the "hello" 1110 among the personalized feature data of the "hello" 1110. For example, the processor 320 may acquire encoded personalized data "hello" 1120 (e.g., ) by converting the shape of a symbol (or a letter), among the personalized feature data of the "hello" 1110, to another shape, converting the x-y ratio of the "hello" 1110 to another ratio, converting slope 1 to slope 2, converting α and/or β corresponding to a skew to γ and/or δ, converting the cursive script of the "hello" 1110 to another cursive script, converting the space between letters of the "hello" 1110 to another space, converting pressure applied by a pen tip during the input of the "hello" 1110 to another pressure, converting the azimuth of a pen relative to an input surface during the input of the "hello" 1110 to another angle, converting the elevation angle (tilt) of the pen relative to the input surface during the input of the "hello" 1110 to another elevation angle, and/or the speed and acceleration of writing of the "hello" 1110 to other values.

Referring to FIG. 11B, a processor (e.g., the processor 120 in FIG. 1 or the processor 320 in FIG. 3) of an electronic device (e.g., the electronic device 101 in FIG. 1, the electronic device 200 in FIG. 2, or the electronic device 301 in FIG. 3) may identify, based on the input of handwritten information such as the letter "a" 1130 (e.g., ), the type of the input handwritten information as text. The processor 320 according to an embodiment may perform encoding such that a personalized feature acquired from the "a" 1130 has a different feature. For example, the processor 320 may acquire encoded personalized data by converting, to other values, the shape of a symbol (or a letter), the x-y ratio of the "a" 1130, the size of the "a" 1130 (e.g., a large size, a medium size, or a small size), the slope (e.g., slope 1) of the "a" 1130, the skew of the "a" 1130, the cursive script of the "a" 1130, pressure applied by a pen tip during the input of the "a" 1130, the azimuth of a pen relative to an input surface during the input of the "a" 1130, the elevation angle (tilt) of the pen relative to the input surface during the input of the "a" 1130, and/or the speed and acceleration of writing of the "a" 1130 among the personalized feature data of the "a" 1130. For example, the processor 320 may acquire encoded personalized data "a" 1140 (e.g., ) by converting the shape of a symbol (or a letter), among the personalized feature data of the "a" 1130, to another shape, converting the x-y ratio (e.g., y2-y1/x2-x1) of the "a" 1130 to another ratio, converting slope 1 to slope 2, and/or converting to the cursive script of the "a" 1130 to another cursive script.

Referring to FIG. 11C, a processor (e.g., the processor 120 in FIG. 1 or the processor 320 in FIG. 3) of an electronic device (e.g., the electronic device 101 in FIG. 1, the electronic device 200 in FIG. 2, or the electronic device 301 in FIG. 3) may identify, based on the input of handwritten information such as "J. Deenil" 1150 (e.g., ), the type of the input handwritten information as a signature. The processor 320 according to an embodiment may perform encoding such that a personalized feature acquired from the "J. Deenil" 1150 has a different feature. For example, the processor 320 may acquire encoded personalized data by converting, to other values, the shape of a symbol (or a letter), the x-y ratio of the "J. Deenil" 1150, the size of the "J. Deenil" 1150 (e.g., a large size, a medium size, or a small size), the slope (e.g., slope 1) of the "J. Deenil" 1150, the skew of the "J. Deenil" 1150, the cursive script of the "J. Deenil" 1150, pressure applied by a pen tip during the input of the "J. Deenil" 1150, the azimuth of a pen relative to an input surface during the input of the "J. Deenil" 1150, the elevation angle (tilt) of the pen relative to the input surface during the input of the "J. Deenil" 1150, and/or the speed and acceleration of writing of the "J. Deenil" 1150 among the personalized feature data of the "J. Deenil" 1150. For example, the processor 320 may acquire encoded personalized data "J. Deenil" 1160 (e.g., ) by converting a symbol (or a letter), among the personalized feature data of "J. Deenil" 1150, to another shape, converting the x-y ratio (e.g., y2-y1/x2-x1) of the "J. Deenil" 1150 to another ratio, converting slope 1 to slope 2, converting the cursive script of the "J. Deenil" 1150 to another cursive script, and converting, to other values, the skew of the "J. Deenil" 1150, the cursive script of the "J. Deenil" 1150, pressure applied by a pen tip during the input of the "J. Deenil" 1150, the azimuth of a pen relative to an input surface during the input of the "J. Deenil" 1150, the elevation angle (tilt) of the pen relative to the input surface during the input of the "J. Deenil" 1150, and/or the speed and acceleration of writing of the "J. Deenil" 1150.

Figure 12:
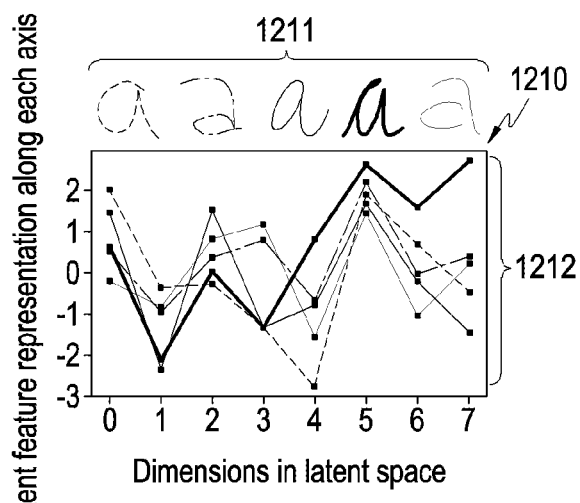
FIG. 12 illustrates an example in which a letter-level personalized feature is acquired from text-type handwritten information according to an embodiment.
Figure 12:
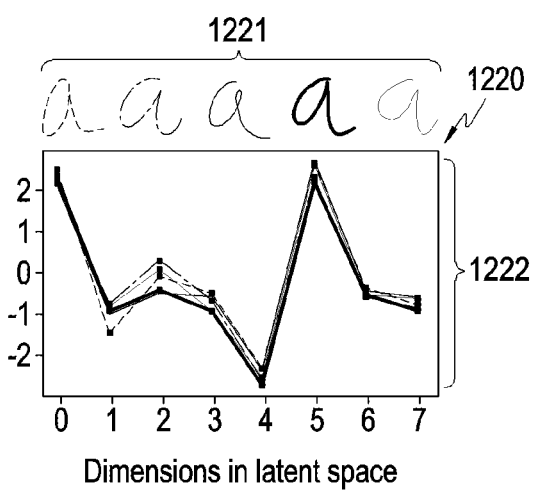

FIG. 12 illustrates an example in which a letter-level personalized feature is acquired from text-type handwritten information according to an embodiment.

Referring to FIG. 12, a processor (e.g., the processor 120 in FIG. 1 or the processor 320 in FIG. 3) of an electronic device (e.g., the electronic device 101 in FIG. 1, the electronic device 200 in FIG. 2, or the electronic device 301 in FIG. 3) may identify a personalized feature based on the allograph feature of a letter included in handwritten information. A first graph 1210 according to an embodiment may be a graph showing allograph features 1212 of heteromorphic letters (e.g., identical letters having different shapes) 1211. A second graph 1220 according to an embodiment may be a graph showing allograph features 1222 of isomorphic letters (e.g., identical letters having similar shapes) 1221. In each graph, the horizontal axis may indicate dimensions in latent space, and the vertical axis may indicate latent feature representation along each axis. For example, the processor 320 may convert, based on a letter-level allograph in the handwritten information, each letter using DNN such that each letter has an allograph having a difference greater than or equal to a designated allograph difference value.

Figure 13:
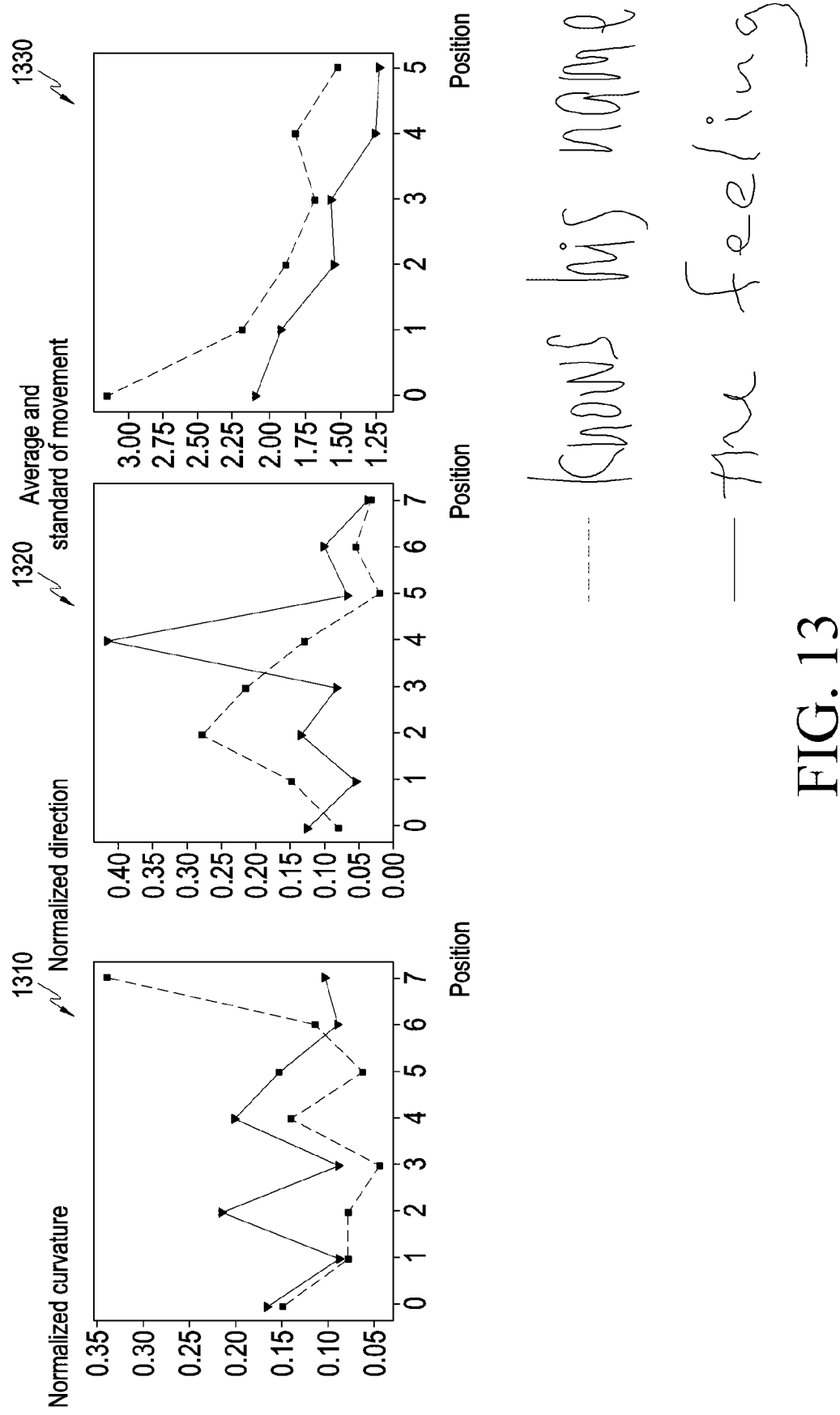
FIG. 13 illustrates an example of a word-level personalized feature in text-type handwritten information according to an embodiment.

FIG. 13 illustrates an example of a word-level personalized feature in text-type handwritten information according to an embodiment.

Referring to FIG. 13, a processor (e.g., the processor 120 in FIG. 1 or the processor 320 in FIG. 3) of an electronic device (e.g., the electronic device 101 in FIG. 1, the electronic device 200 in FIG. 2, or the electronic device 301 in FIG. 3) may identify a personalized feature based on geometrical features of words included in handwritten information. A first graph 1310 according to an embodiment may be a graph showing curvature histogram features. In the first graph 1310 according to an embodiment, the vertical axis may indicate a normalized curvature, and the horizontal axis may indicate a position on the x-axis. A second graph 1320 according to an embodiment may be a graph showing direction histogram features. In the second graph 1320 according to an embodiment, the vertical axis may indicate a normalized direction, and the horizontal axis may indicate a position on the x-axis. A third graph 1330 according to an embodiment may be a graph showing average and standard features of movement based on x-coordinate speed and acceleration. In the third graph 1330 according to an embodiment, the vertical axis may indicate average and standard features of movement based on x-coordinate speed and acceleration, and the horizontal axis may indicate a position on the x-axis. For example, with respect to input handwritten information such as "knows his name" and "The feeling", the processor 320 may identify different normalized curvature features, normalized direction features, and/or average and standard features of movement based on x-coordinate speed and acceleration. For example, the processor 320 may encode (convert) geometrical features (normalized curvature features, normalized direction features, and/or average and standard features of movement based on x-coordinate speed and acceleration) of words included in the handwritten information such that the geometrical features have a difference greater than or equal to a designated difference value.

Figure 14:
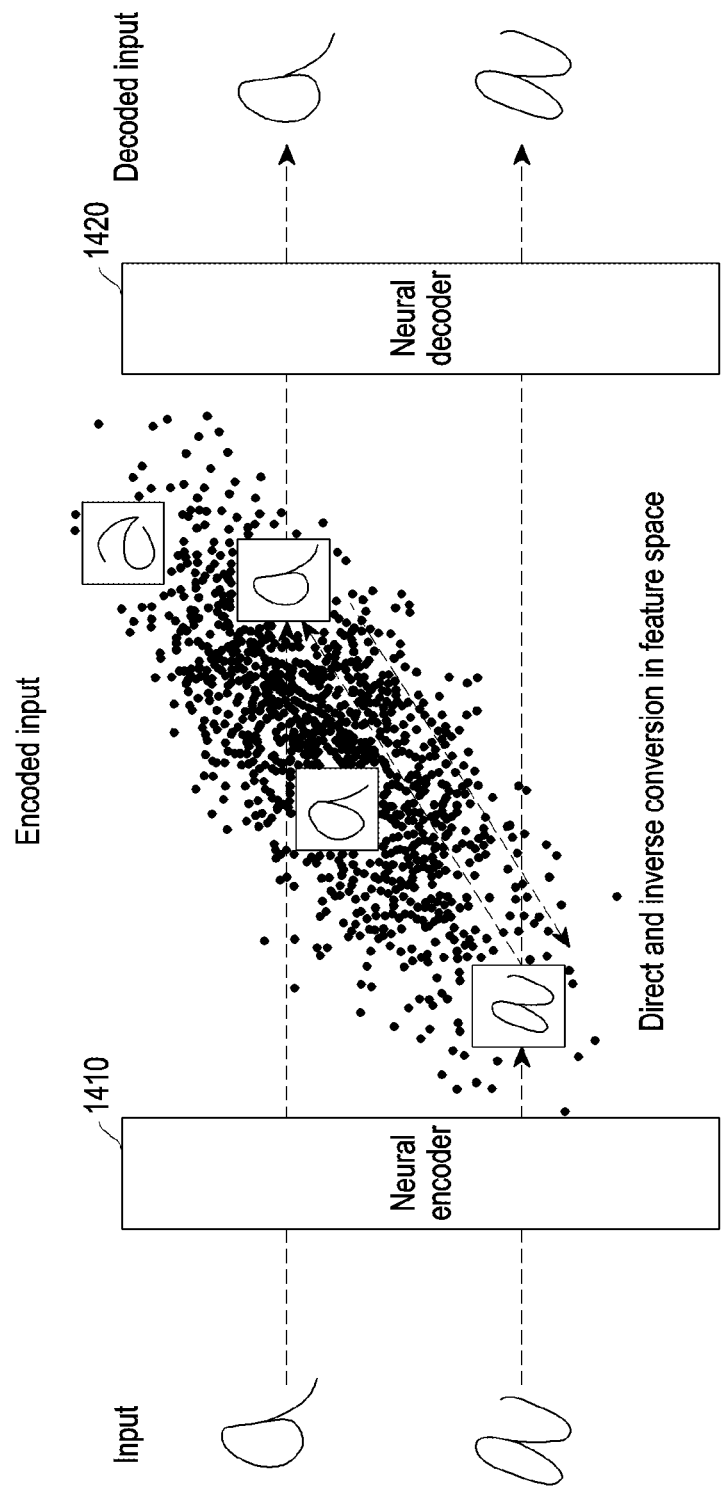
FIG. 14 illustrates an example of encoding and decoding a letter-level personalized feature according to an embodiment.

FIG. 14 illustrates an example of encoding and decoding a letter-level personalized feature according to an embodiment.

Referring to FIG. 14, a processor (e.g., the processor 120 in FIG. 1 or the processor 320 in FIG. 3) of an electronic device (e.g., the electronic device 101 in FIG. 1, the electronic device 200 in FIG. 2, or the electronic device 301 in FIG. 3) may include or use a DNN-based neural encoder 1410 and a DNN-based neural decoder 1420 for extracting a single letter from handwriting information and encoding and decoding a personalized feature of a single letter-level input. The processor 320 according to an embodiment may directly encode (convert) a personalized feature of a letter-level input in a feature space by using the neural encoder 1410, thereby acquiring an encoded input. The processor 320 according to an embodiment may directly decode (inverse-convert) the encoded input by using neural decoder 1410, thereby acquiring a decoded input (an original input).

Figure 15:
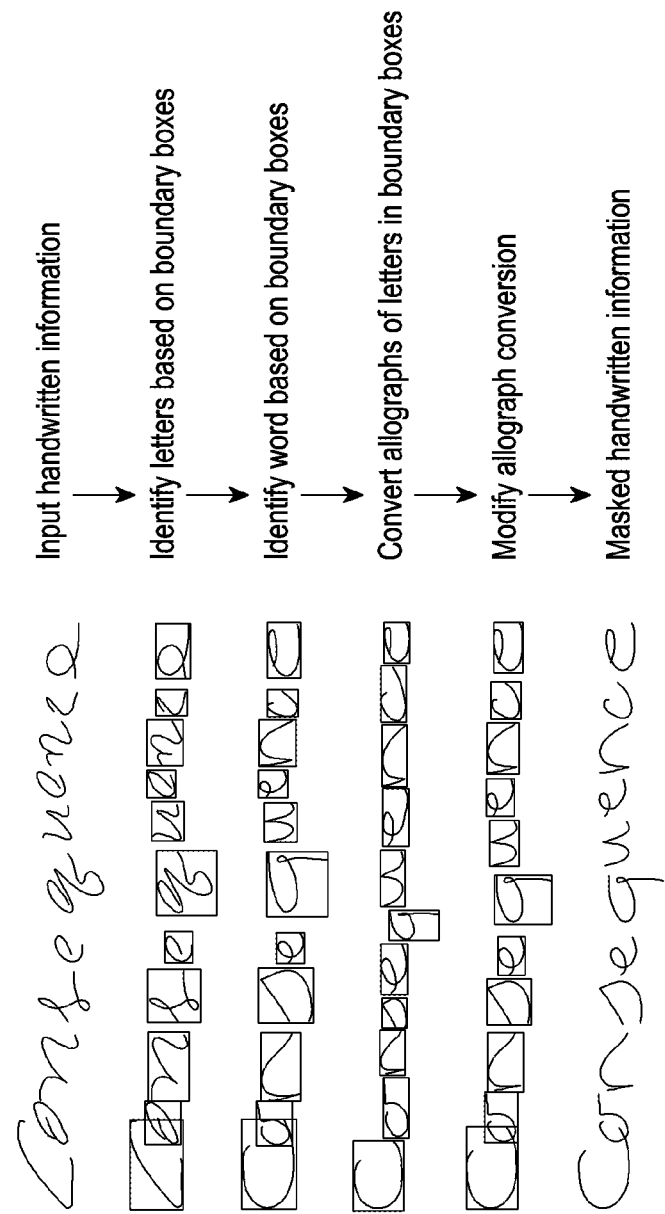
FIG. 15 illustrates an example of word-level masking according to an embodiment.

FIG. 15 illustrates an example of word-level masking according to an embodiment.

Referring to FIG. 15, a processor (e.g., the processor 120 in FIG. 1 or the processor 320 in FIG. 3) of an electronic device (e.g., the electronic device 101 in FIG. 1, the electronic device 200 in FIG. 2, or the electronic device 301 in FIG. 3) may receive word-level handwritten information (e.g., consequence). When the word-level handwritten information is input, the processor 320 according to an embodiment may identify letters, based on boundary boxes, and may identify a word, based on the letters identified based on the boundary boxes. The processor 320 according to an embodiment may convert allographs of letters in the boundary boxes of identified word, and may modify the allograph conversion to acquire masked handwritten information.

Figure 16:
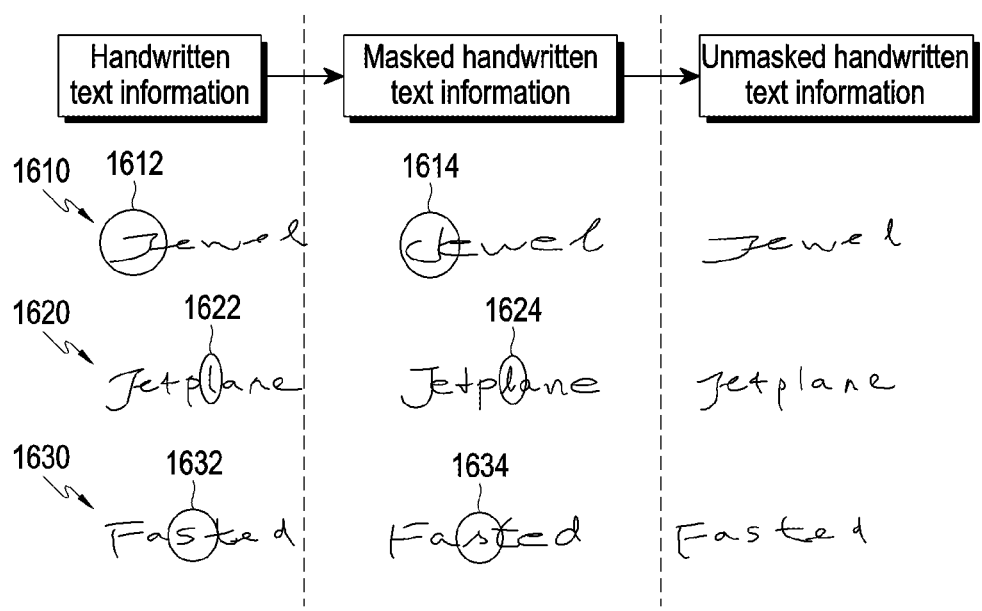
FIG. 16 illustrates of an example of masking and unmasking handwritten text information according to an embodiment.

FIG. 16 illustrates of an example of masking and unmasking handwritten text information according to an embodiment.

Referring to FIG. 16, a processor (e.g., the processor 120 in FIG. 1 or the processor 320 in FIG. 3) of an electronic device (e.g., the electronic device 101 in FIG. 1, the electronic device 200 in FIG. 2, or the electronic device 301 in FIG. 3) may mask handwritten text information (e.g., text-type handwritten information) to acquire masked handwritten text information, and may unmask the masked handwritten text information to acquire unmasked handwritten text information. For example, the processor 320 may identify personalized feature data (e.g., handwriting style) and content data (e.g., text data) from handwritten text information such as Jewel 1610, Jetplane 1620, or Fasted 1630, may encode the personalized feature data to acquire encoded personalized feature data, and may acquire masked handwritten text information by using the encoded personalized feature data and the content data. For example, the processor 320 may decode the encoded personalized feature data from the masked handwritten text information, and may acquire unmasked handwritten text information using the decoded personalized feature data and the content data. For example, the processor 320 may convert, upon masking, a personalized feature (or a handwriting style) of J 1612 of the Jewel 1610 into J 1614 of another personalized feature (or another style). For example, the processor 320 may convert, upon masking, a personalized feature (or a handwriting style) of 1 1622 of the Jetplane 1620 into 1 1624 of another personalized feature (or another style). For example, the processor 320 may convert, upon masking, a personalized feature (or a handwriting style) of s 1632 of the Fasted 1630 into s 1634 of another personalized feature (or another style).

Figure 17:
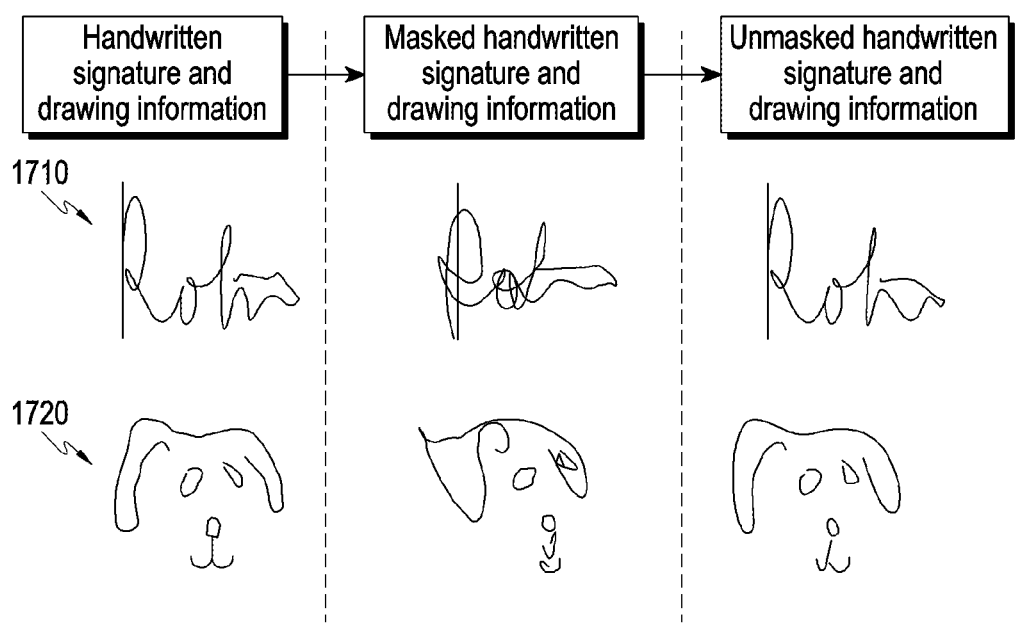
FIG. 17 illustrates an example of masking and unmasking handwritten signature or drawing information according to an embodiment.

FIG. 17 illustrates an example of masking and unmasking handwritten signature or drawing information according to an embodiment.

Referring to FIG. 17, a processor (e.g., the processor 120 in FIG. 1 or the processor 320 in FIG. 3) of an electronic device (e.g., the electronic device 101 in FIG. 1, the electronic device 200 in FIG. 2, or the electronic device 301 in FIG. 3) may mask handwritten signature or drawing information (e.g., signature- or drawing-type handwritten information) to acquire masked handwritten signature or drawing information, and may unmask the masked handwritten signature or drawing information to acquire unmasked handwritten signature or drawing information. For example, the processor 320 may identify personalized feature data (e.g., a signature style) and content data (e.g., a signature image) from handwritten signature information 1710, may encode the personalized feature data to acquire encoded personalized feature data, and may acquire masked handwritten signature information using the encoded personalized feature data and the content data. For example, the processor 320 may decode the encoded personalized feature data from the masked handwritten signature information, and may acquire unmasked handwritten signature information using the decoded personalized feature data and the content data. For example, the processor 320 may identify personalized feature data (e.g., a drawing style) and content data (e.g., a drawing image) from handwritten drawing information 1720, may encode the personalized feature data to acquire the encoded personalized feature data, and may acquire masked handwritten drawing information by using the encoded personalized feature data and the content data. For example, the processor 320 may decode the encoded personalized feature data from the masked handwritten drawing information, and may acquire unmasked handwritten drawing information using the decoded personalized feature data and the content data.

Figure 18:
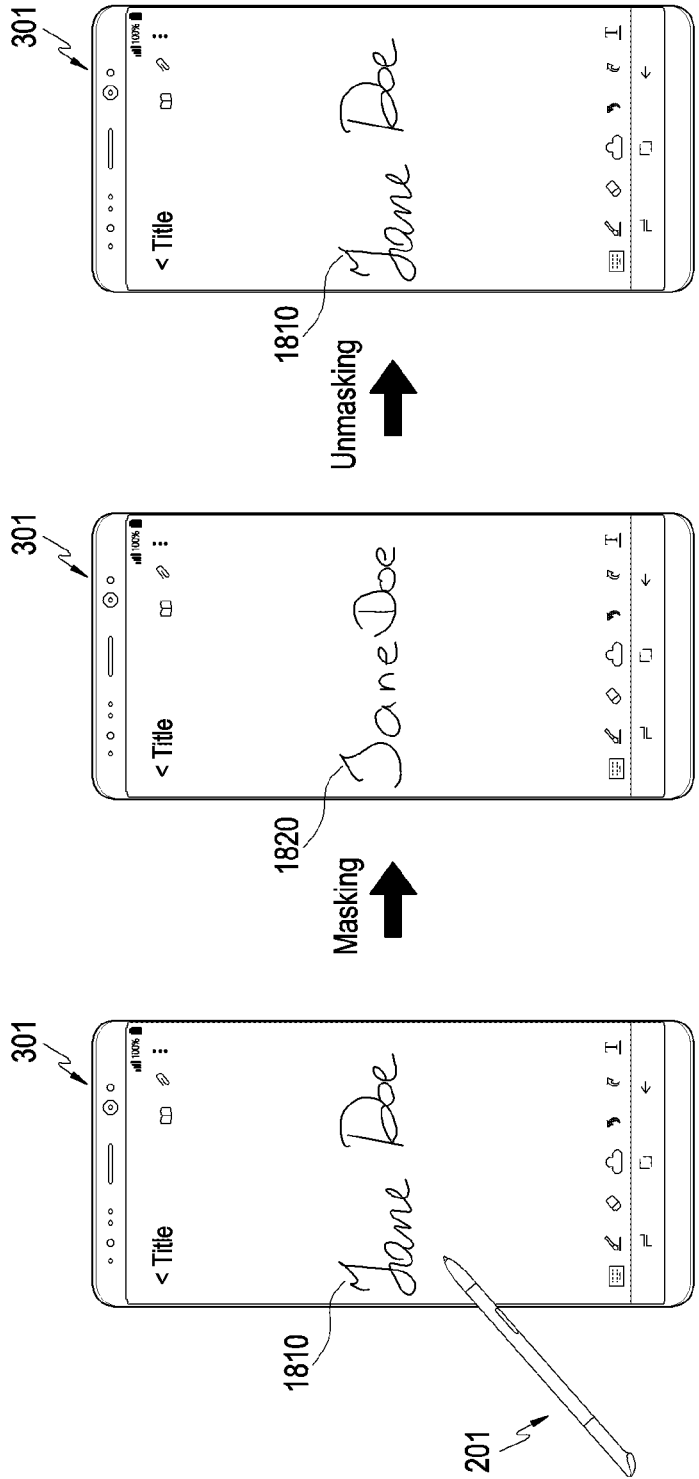
FIG. 18 illustrates an example of a personal information protection using masking and unmasking in a service in which handwritten signature information and personal information according to an embodiment can be linked with each other.

FIG. 18 illustrates an example of personal information protection using masking and unmasking in a service in which handwritten signature information and personal information according to an embodiment can be linked with each other.

Referring to FIG. 18, a processor (e.g., the processor 120 in FIG. 1 or the processor 320 in FIG. 3) of an electronic device (e.g., the electronic device 101 in FIG. 1, the electronic device 200 in FIG. 2, or the electronic device 301 in FIG. 3) may identify, from handwritten signature information 1810 (e.g., Jane Doe), a user's personal information corresponding to the handwritten signature information 1810. For example, the personal information may further include age, sex, ID, health information (health info), and/or other types of information related to an individual. The processor 320 according to an embodiment may mask the handwritten signature information 1810 such that personal information is not identified, and may use masked handwritten signature information 1820. For example, the processor 320 according to an embodiment may mask the handwritten signature information 1810 and use the masked handwritten signature information 1820, thereby preventing spoofing of the handwritten signature information 1810 and preventing leakage of the personal information by the handwritten signature information 1810 from being leaked. In a state in which security is maintained, the processor 320 according to an embodiment may unmask the masked handwritten signature information 1820 and allow the unmasked handwritten signature information 1810 to be used, thereby selecting whether to use the handwritten signature information 1810 in a masked state or in an unmasked state depending on security.

Figure 19:
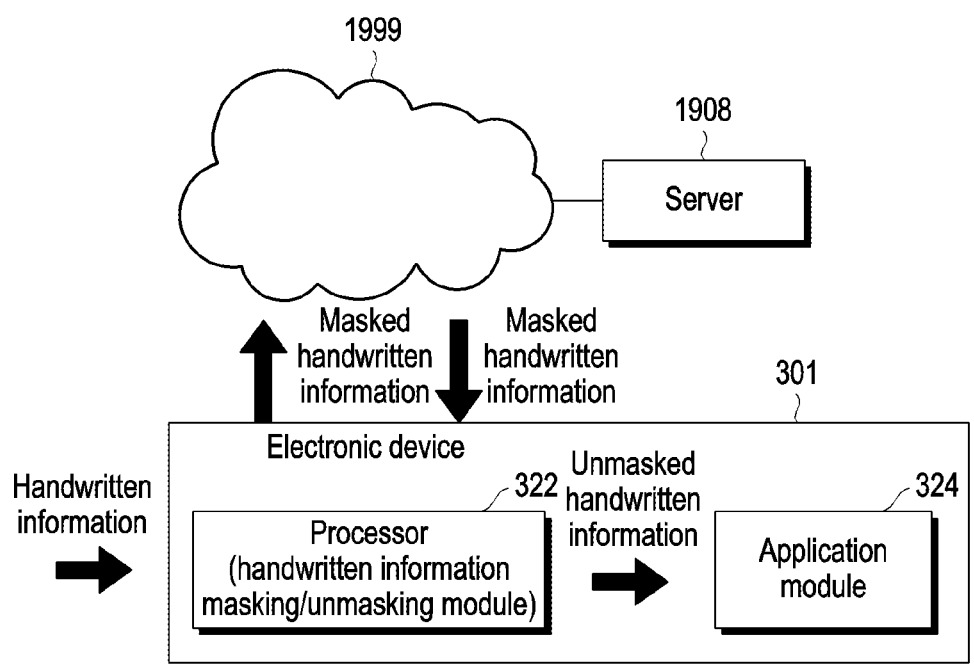
FIG. 19 illustrates an example of use of masking and unmasking when handwritten information according to an embodiment is used in a cloud-based server.

FIG. 19 illustrates an example of use of masking and unmasking when handwritten information according to an embodiment is used in a cloud-based server.

Referring to FIG. 19, a server 1908 (e.g., the server 108 in FIG. 1) according to an embodiment may store, process, and recognize various data. Data of the server 1908 based on a cloud 1999 may be publicly accessed by multiple users, and may be more likely to be hacked. Therefore, when handwritten information is stored as it is in the server 1908 based on the cloud 1999, a user's handwritten information may be accessed by a malicious person, and thus personal information may be exposed. When handwritten information is required to be provided to the server 1908 based on the cloud 1999, a processor (e.g., the processor 120 in FIG. 1 or the processor 320 in FIG. 3) of an electronic device (e.g., the electronic device 101 in FIG. 1, the electronic device 200 in FIG. 2, or the electronic device 301 in FIG. 3) may mask the handwritten information through a handwritten information masking/unmasking module, and may provide the masked handwritten information to the server 1908. According to an embodiment, even if the masked handwritten information is hacked, a personalized feature of the handwritten information may be prevented from being exposed in a state in which the personalized feature is encoded. The processor 320 according to an embodiment may acquire and use the masked handwritten information stored in the server 1908 based on the cloud 1999, and may unmask the masked handwritten information and may process the unmasked handwritten information such that the unmasked handwritten information can be used by an application module (or an application) 324 executed in the electronic device 301.

Figure 20:
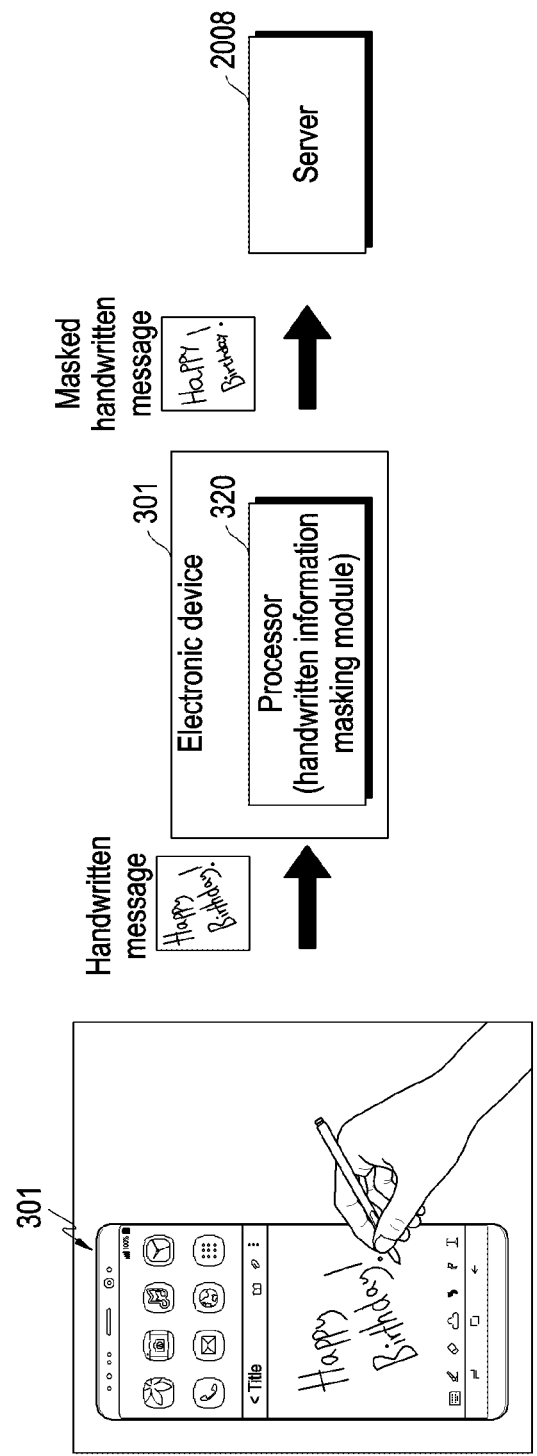
FIG. 20 illustrates an example of use of masking and unmasking when transmitting a handwritten message according to an embodiment.

FIG. 20 illustrates an example of use of masking and unmasking when transmitting a handwritten message according to an embodiment.

Referring to FIG. 20, a processor (e.g., the processor 120 in FIG. 1 or the processor 320 in FIG. 3) of an electronic device (e.g., the electronic device 101 in FIG. 1, the electronic device 200 in FIG. 2, or the electronic device 301 in FIG. 3) may receive a request for input or transmission of a handwritten message (or a live message or handwritten information) input from a user through a message transmission application. For example, the live message may be an animation message made based on the handwritten information, and data corresponding to the live message may include personal data of a user. For example, when a live message is transmitted through a public channel (through a messenger or a social network), the personal data of the user may be likely to be hacked. The processor 320 according to an embodiment may mask the live message using a handwritten information masking module, and may transmit the masked live message to the message server 2008. For example, the message server 2008 may be a server associated with a messenger and a social network. The message server 2008 may transmit the masked live message to a recipient. An electronic device (not shown) of the recipient may unmask the live message, and may display the unmasked live message. For example, the electronic device (not shown) of the recipient may be an electronic device which has a function of unmasking the live message or is allowed to unmask the live message.

Figure 21:
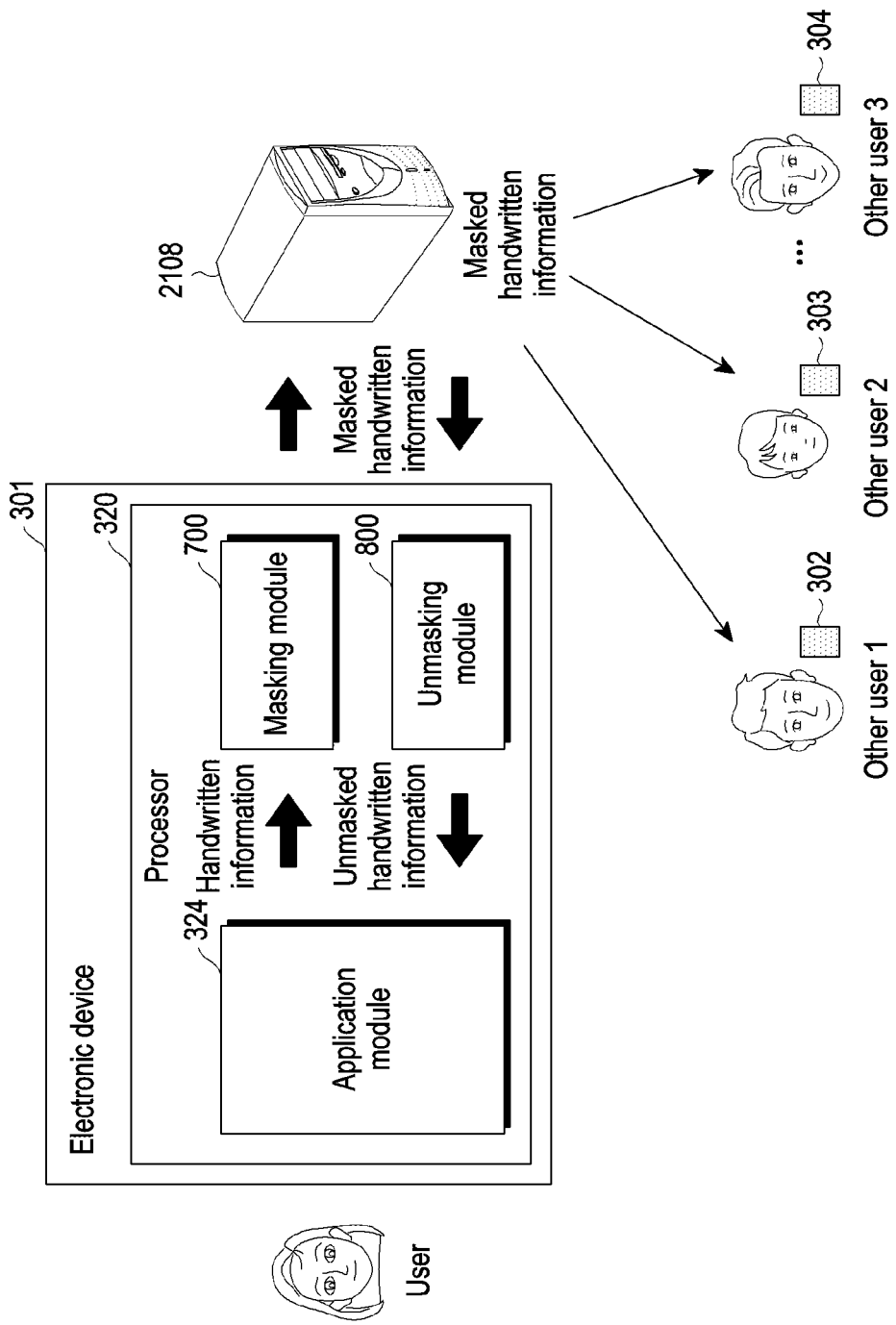
FIG. 21 illustrates an example of masking and unmasking handwritten information in a multi-user access device according to an embodiment.

FIG. 21 illustrates an example of masking and unmasking handwritten information in a multi-user access device according to an embodiment.

Referring to FIG. 21, a multi-user access device 2108 (e.g., the external server 108) according to an embodiment may be a device which can store handwritten information (a written note, a comment on text, a signature, and/or a drawing) of a user of the electronic device 301 and is capable of transmitting or sharing (or publishing) the stored handwritten information of the user to or with (to) at least one other electronic device (e.g., 302, 303, and/or 304) of at least one other user (e.g., other user 1, other user 2, other user 3, and/or other users). When the handwritten information of the user is to be transmitted or shared (published) to or with (to) the multi-user access device 2108, a processor (e.g., the processor 120 in FIG. 1 or the processor 320 in FIG. 3) of an electronic device (e.g., the electronic device 101 in FIG. 1, the electronic device 200 in FIG. 2, or the electronic device 301 in FIG. 3) may mask the handwritten information through the handwritten information masking module 700 and may provide the masked handwritten information to the multi-user access device 2108. The multi-user access device 2108 may transmit or share (or publish) the masked handwritten information instead of actual handwritten information to or with (to) the at least one other electronic device (e.g., 302, 303, and/or 304) of the at least one other user (e.g., other user 1, other user 2, other user 3, and/or other users). According to an embodiment, even if the masked handwritten information is hacked, a personalized feature of the handwritten information may be prevented from being exposed in a state in which the personalized feature is encoded. The electronic device 301 according to an embodiment may receive other masked handwritten information that is transmitted from the at least one other electronic device (e.g., 302, 303, and/or 304) of the at least one other user (e.g., other user 1, other user 2, other user 3, and/or other users) to the multi-user access device 2108 or shared (or published) with (to) the multi-user access device 2108, and may unmask the received masked handwritten information through the handwritten information unmasking module 800 and may use the unmasked handwritten information through the application module 324. For example, the application module 324 may be application software that enables transmission of the handwritten information, sharing of the handwritten information, or reception of the masked handwritten information through the multi-user access device 2108.

Figure 22:
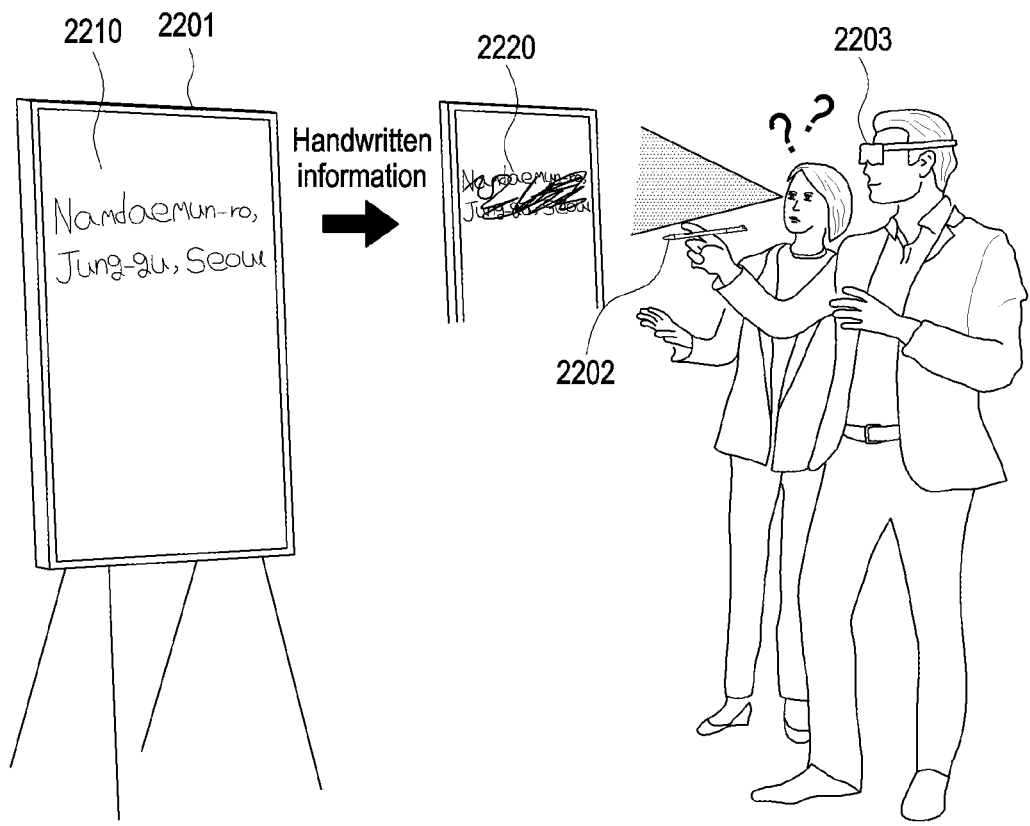
FIG. 22 illustrates an example of masking and unmasking handwritten information by using another electronic device capable of interworking with an electronic device according to an embodiment.

FIG. 22 illustrates an example of masking and unmasking handwritten information using another electronic device capable of interworking with an electronic device according to an embodiment.

Referring to FIG. 22, a processor (e.g., the processor 120 in FIG. 1 or the processor 320 in FIG. 3) of an electronic device 2201 (e.g., the electronic device 101 in FIG. 1, the electronic device 200 in FIG. 2, or the electronic device 301 in FIG. 3) according to an embodiment may receive and mask handwritten information 2210 that is input by a stylus pen 2202 (e.g., the pen 201 in FIG. 2), and may display masked handwritten information 2220. The electronic device 2201 according to an embodiment may provide the unmasked handwritten information 2210 to another electronic device 2203 capable of interworking with the electronic device 2201, and the electronic device 2201 itself may display the masked (or obfuscated) handwritten information 2220. For example, the other electronic device 2203 may include an AR glasses device. The AR glasses device may allow a first user wearing the AR glasses to identify the unmasked handwritten information 2210, whereas the electronic device 2201 may allow a second user who does not wear the AR glasses to view only the masked handwritten information 2220, whereby the handwritten information can be provided only to an authorized user (e.g., the first user).

According to an embodiment, a processor (e.g., the processor 120 in FIG. 1 or the processor 320 in FIG. 3) of the electronic device 2201 (e.g., the electronic device 101 in FIG. 1, the electronic device 200 in FIG. 2, or the electronic device 301 in FIG. 3) may also mask handwritten information written by a user in metaverse and extended reality (XR) environments, may record the masked handwritten information in the metaverse and XR environments, and may separately store personalized feature data, whereby a user personalized feature of the handwritten information may be used through the personalized feature data later without leakage of personal information due to the handwritten information.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. The term "non-transitory" storage medium may refer, for example, to a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments, in a non-transitory storage medium storing instructions, the instructions may be configured to cause, when being executed by at least one processor of an electronic device, the electronic device to perform at least one operation, and the at least one operation may include acquiring, based on the input of first handwritten information, first personalized feature data corresponding to a first personalized feature from the first handwritten information, acquiring, from the first handwritten information, first content data from which the first personalized feature has been removed, encoding the first personalized feature data, acquiring first masked handwritten information based on the encoded first personalized feature data and the first content data, and providing the first masked handwritten information on a display of the electronic device.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a display;
memory; and
at least one processor operatively connected to the display and the memory,
wherein one or more of the at least one processor is configured to:
receive an input of first handwriting;
acquire first personalized feature data from the first handwriting, the first personalized feature data corresponding to a first personalized feature of a handwriting characteristic of the first handwriting;
acquire, from the first handwriting, first content data from which the first personalized feature has been removed;
encode the first personalized feature data;
acquire first masked handwriting, different from the first handwriting, based on the encoded first personalized feature data and the first content data; and
provide the first masked handwriting on the display.

2. The electronic device of claim 1,
wherein the first personalized feature indicates the handwriting characteristic of a user corresponding to the first handwriting, and wherein the first personalized feature data includes data corresponding to at least one among a shape of a symbol or a letter included in the first handwriting, an x-y ratio of the first handwriting, a size of the first handwriting, a slope of the first handwriting, a skew of the first handwriting, cursive script of the first handwriting, a space between symbols included in the first handwriting, pressure applied by an input device during the input of the first handwriting, an azimuth of the input device relative to an input surface during the input of the first handwriting, an elevation angle of the input device relative to the input surface during the input of the first handwriting, or a speed and acceleration of writing of the first handwriting.

3. The electronic device of claim 1, further comprising a secure memory,
wherein one or more of the at least one processor is configured to store the first personalized feature data in secure memory.

4. The electronic device of claim 1, wherein one or more of the at least one processor is configured to identify a type of the first handwriting as at least one among text handwriting, signature handwriting, or a drawing information.

5. The electronic device of claim 4, wherein one or more of the at least one processor is configured to paraphrase text data included in the first content data in response to the type of the first handwriting being the text handwriting, and acquire the first masked handwriting, based on the encoded first personalized feature data and the paraphrased text data.

6. The electronic device of claim 4, wherein one or more of the at least one processor is configured to acquire the first masked handwriting, based on the encoded first personalized feature data and signature data or drawing data included in the first content data, in response to the type of the first handwriting being the signature handwriting or the drawing.

7. The electronic device of claim 1, wherein one or more of the at least one processor is configured to encode the first personalized feature data using a deep neural network (DNN)-based conversion-type encoder.

8. The electronic device of claim 7, wherein the DNN-based conversion-type encoder comprises an adversarial autoencoder (AAE) or a variational autoencoder (VAE).

9. The electronic device of claim 1, wherein one or more of the at least one processor is configured to identify, based on input of second masked handwriting, encoded second personalized feature data and second content data from the second masked handwriting, decode the encoded second personalized feature data, acquire unmasked second handwriting based on the decoded second personalized feature data and the second content data, and provide the unmasked second handwriting on the display.

10. The electronic device of claim 9, wherein one or more of the at least one processor is configured to de-paraphrase text data included in the second content data in response to the type of the second masked handwriting being handwritten text information, and acquire the unmasked second handwriting, based on the decoded second personalized feature data and the de-paraphrased text data.

11. A method for masking handwriting in an electronic device, the method comprising:
receiving an input of first handwriting;
acquiring first personalized feature data from the first handwriting, the first personalized feature data corresponding to a first personalized feature of a handwriting characteristic of the first handwriting;
acquiring, from the first handwriting, first content data from which the first personalized feature has been removed;
encoding the first personalized feature data;
acquiring first masked handwriting, different from the first handwriting, based on the encoded first personalized feature data and the first content data; and
providing the first masked handwriting on a display of the electronic device.

12. The method of claim 11,
wherein the first personalized feature indicates the handwriting characteristic of a user corresponding to the first handwriting, and wherein the first personalized feature data includes data corresponding to at least one among a shape of a symbol or a letter included in the first handwriting, an x-y ratio of the first handwriting, a size of the first handwriting, a slope of the first handwriting, a skew of the first handwriting, cursive script of the first handwriting, a space between symbols included in the first handwriting, pressure applied by an input device during the input of the first handwriting, an azimuth of the input device relative to an input surface during the input of the first handwriting, an elevation angle of the input device relative to the input surface during the input of the first handwriting, or a speed and acceleration of writing of the first handwriting.

13. The method of claim 11, further comprising storing the first personalized feature data in secure memory.

14. The method of claim 11, further comprising identifying a type of the first handwriting as at least one among text handwriting, signature handwriting, or drawing.

15. The method of claim 14, further comprising:
paraphrasing text data included in the first content data in response to the type of the first handwriting being the text handwriting; and
acquiring the first masked handwriting, based on the encoded first personalized feature data and the paraphrased text data.

16. The method of claim 14, further comprising acquiring the first masked handwriting, based on the encoded first personalized feature data and signature data or drawing data included in the first content data, in response to the type of the first handwriting being signature handwriting or drawing.

17. The method of claim 11, wherein the first personalized feature data is encoded using a deep neural network (DNN)-based conversion-type encoder, and
the DNN-based conversion-type encoder comprises an adversarial autoencoder (AAE) or a variational autoencoder (VAE).

18. The method of claim 11, further comprising:
identifying, based on input of second masked handwritinghandwritten information, encoded second personalized feature data and second content data from the second masked handwriting;
decoding the encoded second personalized feature data;
acquiring unmasked second handwriting, based on the decoded second personalized feature data and the second content data; and
providing the unmasked second handwriting on the display.

19. The method of claim 18, further comprising:
de-paraphrasing text data included in the second content data, in response to the type of the second masked handwriting being text handwriting; and
acquiring the unmasked second handwriting, based on the decoded second personalized feature data and the de-paraphrased text data.

20. A non-transitory storage medium storing instructions, wherein the instructions are configured to cause, when being executed by at least one processor of an electronic device, the electronic device to perform at least one operation, and the at least one operation comprises:
receiving an input of first handwriting;
acquiring first personalized feature data from the first handwriting, the first personalized feature data corresponding to a first personalized feature of a handwriting characteristic of the first handwriting;
acquiring, from the first handwriting, first content data from which the first personalized feature has been removed;
encoding the first personalized feature data;
acquiring first masked handwriting, different from the first handwriting, based on the encoded first personalized feature data and the first content data; and
providing the first masked handwriting on a display of the electronic device.

* * * * *